US012762523B2

(12) United States Patent
Baker et al.

(10) Patent No.: US 12,762,523 B2
(45) Date of Patent: Oct. 13, 2026

(54) ATM FOR NON-CUSTOMERS

(71) Applicant: Wells Fargo Bank, N.A., San Francisco, CA (US)

(72) Inventors: Jonathan Baker, San Francisco, CA (US); Kelly Bruno, San Francisco, CA (US); Frank DiGangi, San Francisco, CA (US); Nicolai J. Lesko, San Francisco, CA (US); Stephen George Mueller, San Francisco, CA (US); Heather Cobb Smith, San Francisco, CA (US); Benjamin Taylor, Williston, VT (US); David Winner, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 213 days.

(21) Appl. No.: 18/651,426

(22) Filed: Apr. 30, 2024

(65) Prior Publication Data

US 2025/0335890 A1 Oct. 30, 2025

(51) Int. Cl.
*G06Q 20/10* (2012.01)

(52) U.S. Cl.
CPC ................................ *G06Q 20/1085* (2013.01)

(58) Field of Classification Search
CPC .................................................. G06Q 20/1085
See application file for complete search history.

(56) References Cited

U.S. PATENT DOCUMENTS

| | | | |
|---|---|---|---|
| 11,188,888 | B1 | 11/2021 | Petruzzi et al. |
| 2007/0045395 | A1 | 3/2007 | Corona et al. |

(Continued)

FOREIGN PATENT DOCUMENTS

| | | | | |
|---|---|---|---|---|
| BR | 112020026781 | A2 * | 3/2021 | ......... G06Q 20/4012 |
| CA | 2704864 | A1 * | 8/2010 | ........... G06Q 20/326 |
| GB | 2514156 | A * | 11/2014 | ............. G07D 11/24 |

OTHER PUBLICATIONS

Sako et al,: Image-Recognition Technologies towards Advanced Automated Teller Machines, 2004, Proceedings of the 17th International Conference of Pattern Recognition (ICPR'04), IEEE Computer Society, pp. 1-4 (Year: 2004).*

(Continued)

*Primary Examiner* — Bijendra K Shrestha
(74) *Attorney, Agent, or Firm* — Foley & Lardner LLP

(57) ABSTRACT

Systems and methods relate to an automated teller machine (ATM). The ATM includes a storage repository configured to store a non-monetary media and at least one processor and at least one memory coupled to the at least one processor. The memory has instructions thereon that when executed, cause the at least one processor to, in a first instance, receive, via an input device, a first user input from a user of the ATM regarding a transaction involving the non-monetary media. Additionally, responsive to receiving the first user input, the ATM receives, via at least one media aperture, non-monetary media for storing in the storage repository and provides, via an output device, an access credential associated with the transaction. In a second instance after the first instance, the ATM receives the access credential, validates the access credential, and provides the non-monetary media from the storage repository to the user.

7 Claims, 10 Drawing Sheets

(56) References Cited

U.S. PATENT DOCUMENTS

| | | | |
|---|---|---|---|
| 2007/0174194 | A1 | 7/2007 | Chappell |
| 2011/0288994 | A1 | 11/2011 | Mcgraw et al. |
| 2019/0311340 | A1 | 10/2019 | Baber et al. |
| 2020/0051403 | A1* | 2/2020 | Neufeld .................. E05G 1/024 |
| 2020/0184442 | A1* | 6/2020 | Gu ........................ G06Q 20/208 |
| 2025/0069362 | A1* | 2/2025 | Yarlagadda ............ G06V 20/41 |

OTHER PUBLICATIONS

Pradeep et al.: Security Enhancement for ATM Machine using Mobile Application and IoT Technology, 2024, IEEE, pp. 673-679 (Year: 2024).*

* cited by examiner

ATM FOR NON-CUSTOMERS

TECHNICAL FIELD

The present disclosure relates to apparatuses, systems, and methods for providing expanded functionalities for customers and non-customers at transaction devices, such as automated teller machines (ATMs).

BACKGROUND

ATMs are a convenient way for customers (e.g., cardholders of a financial institution) to complete transactions, such as financial transactions including document deposits, banknote deposits and the like. ATMs may be placed and accessed by customers at various geographic locations, such as bank locations, convenience stores, other stores, or standalone kiosks to facilitate a customer's interaction with the ATM. However, non-customers, such as users who do not have an account with the financial institution associated with the ATM, are generally disincentivized from utilizing an ATM because they may be charged fees for performing transactions (e.g., withdrawal transactions and deposit transactions) via the ATM or may be unable to utilize the ATM without first registering as a customer of the financial institution and/or becoming a cardholder.

SUMMARY

One embodiment of the disclosure relates to an automated teller machine (ATM) including a storage repository configured to store a non-monetary media, at least one processor and at least one memory coupled to the at least one processor, the at least one memory having instructions stored thereon that when executed by the at least one processor, cause the at least one processor to: in a first instance, receive, via an input device, a first user input from a user of the ATM regarding a transaction involving the non-monetary media; responsive to receiving the first user input, receive, via at least one media aperture, at least one non-monetary media for storing in the storage repository; provide, via an output device, an access credential associated with the transaction; in a second subsequent instance relative to the first instance, receive, via the input device, the access credential associated with the transaction; validate the received access credential; and responsive to receiving and validating the access credential associated with the transaction, provide, via the at least one media aperture, the at least one non-monetary media from the storage repository to the user.

Another embodiment of the present disclosure relates to a method of using an automated teller machine (ATM). The method includes the steps of, in a first instance, receiving, via an input device, a first user input from a user of the ATM regarding a transaction involving a non-monetary media; responsive to receiving the first user input, receiving, via at least one media aperture, at least one non-monetary media for storing in the storage repository; providing, via an output device, an access credential associated with the transaction; in a second subsequent instance relative to the first instance, receiving, via the input device, the access credential associated with the transaction; validating the received access credential; and responsive to receiving and validating the access credential associated with the transaction, providing, via the at least one media aperture, the at least one non-monetary media from the storage repository to the user.

A further embodiment of the present disclosure relates to a system comprising an automated teller machine (ATM)

associated with a provider institution computing system. The ATM includes at least one processor and at least one memory having instructions stored thereon that when executed by the at least one processor, cause the at least one processor to: receive, via an input device, a first user input regarding an identifier of a user at the ATM; send the first user input to a provider institution computing system; receive an indication that the first user input is associated with a non-customer; prompt the user for user data; create a non-customer banking channel associated with the ATM and the user data where the non-customer banking channel is configured to manage a non-customer account balance up to a non-customer account limit; apply at least one restriction to at least one non-customer transaction; and perform, by at least one of the ATM or the provider institution computing system, the at least one non-customer transaction.

DETAILED DESCRIPTION

Figure 1:
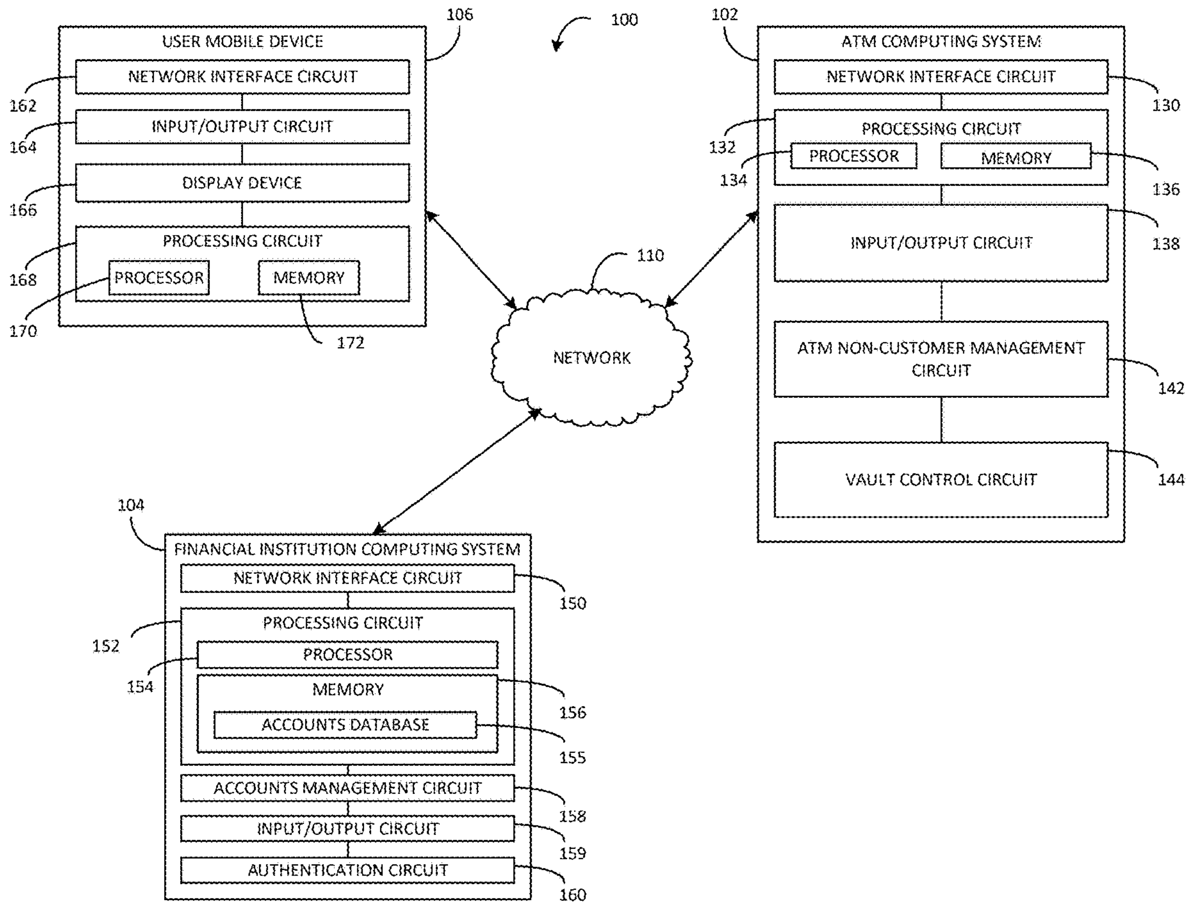
FIG. 1 is a block diagram of a transaction computing system, according to an example embodiment.

Current ATM systems do not offer specialized functionalities directed to non-customers that provide the non-customers with a service or associated benefit by utilizing the ATM. The widespread availability of ATM systems and their ability to communicate with financial institution computer systems, third-party computer systems, and the like makes ATM systems an easily accessible medium capable of providing services beyond traditional financial transactions to both customers of a financial institution and non-customers. Accordingly, the present disclosure relates to ATM systems capable of performing expanded functionalities that benefit both customers of the financial institution associated with the ATM and non-customers of the financial institution. For example, and as discussed herein, ATM systems may operate as a storage repository for non-monetary items, may host specialized banking channels accessible to non-customers (e.g., non-cardholders) of the financial institution, may allow customers and non-customers to donate funds to third-party (e.g., charitable) accounts, or may allow non-customers to conduct transactions with third parties (e.g., cash checks drawn on a financial institution not associated with the ATM) via the ATM interface.

The ATMs including a non-monetary storage repository disclosed herein may enable one or more ATM transactions which may include, but are not limited to, temporary storage of non-monetary media for safekeeping, rental of non-monetary media from the ATM for a designated time period, exchange of non-monetary media into the ATM storage repository for currency, exchange of currency into the ATM monetary repository for non-monetary media, and so on. Beneficially, the transaction devices (e.g., the ATM) disclosed herein include improved graphical user interfaces which allow limited access to the secure area of the ATM vault. The increased access to the ATM vault provides more security for the storage of personal items, allows secure transfers of valuable items, and/or permits the convenient trade-in or sale of non-monetary items via readily available ATM terminals. Further, the ATM devices disclosed herein provide increased financial flexibility to non-customers through non-customer banking channels hosted or otherwise associated with the ATM. Non-customer banking channels enable individuals without an existing account to access certain banking services and store their funds in the secure ATM environment behind additional layers of authentication and protection otherwise unavailable to non-account holders. Additionally, the non-customer may convert their non-customer banking channel into a formal customer account, such as a checking account, deposit account, savings account, or similar. This conversion process allows the non-customer to transition seamlessly to a more comprehensive banking relationship with the provider institution, allowing the non-customer access to a broader range of financial services and benefits.

The systems, methods, computer readable media, apparatuses, and the like described herein relate to ATM systems with expanded functionalities, improved security hardware, increased transaction speed and geographic range, among other benefits. According to various embodiments described herein, this disclosure relates to a technical solution of safely and efficiently storing, exchanging, and purchasing non-monetary media via an ATM system and regulating access to non-monetary media to authorized customers or non-customers of a financial institution. Advantageously, a user of the ATM may store, receive, or exchange non-monetary media via an ATM terminal and control or regulate access to the non-monetary media. For example, a non-customer of the ATM may deposit a cell phone, purse, car keys, or the like into the ATM and receive access credentials to retrieve the ATM from a non-monetary storage repository thereof. The non-customer may then perform an activity such as swimming, fishing, surfing or the like while the non-monetary media is securely kept inside the ATM. The user may then return and collect the non-monetary media upon entering access credentials, a code, etc.

Further, this disclosure relates to a technical solution of increasing accessibility of monetary accounts and increasing the speed and efficiency with which non-customers may create a financial account at a financial institution. Beneficially, a non-customer of a financial association may utilize the ATM to open a banking channel through which the non-customer can store and receive money to and from the ATM as if the ATM were a banker, a miniature bank account, or the like. Continuing this example, the non-customer may enter identification info and convert the non-customer account to a full customer account (e.g., a checking account at the financial institution) via the ATM. This may offload the data storage and processing away from the financial institution computer system and increase the efficiency and speed of customer account creation or transaction processing by incrementing the process of account registration into multiple parts. For example, a first part includes registering as a non-customer and creating a non-customer account, and a second part includes (possible at a later time) converting the non-customer account to a customer account.

Accordingly, the systems, methods, computer readable media, apparatuses, and the like described herein provide and describe various technical improvements to existing ATM systems. A further advantage of this disclosure is expanding the security functionalities of ATM systems to non-monetary media and non-customer financial transactions. ATM systems are improved by incorporating non-monetary storage space and access credentials for ATM users, creating pseudo-bank accounts for non-banked people, creating limited purpose virtual accounts which require minimal identification data (and thereby allow accounts to be created faster) without requiring the registration processes of a full checking, savings, or similar account. Further, banking systems are improved by utilizing the computing power of ATM systems of increase the efficiency of transactions and remove transaction traffic to local ATMs (e.g., diverting transactions to local transactions to and from a non-customer banking channel). In this way, banking systems may dedicate more processing power to customer transactions and the like.

As utilized herein, a “customer” refers to an individual, business, entity, etc. that has registered as an account holder with the financial institution associated with the ATM, is a cardholder of the financial institution associated with the ATM, or the like. For example, a “customer” of Bank A has an established relationship with Bank A by opening an account and utilizing the various financial services offered by Bank A. A “customer” includes an individual who has registered via Bank A’s website and/or has opened a checking and/or savings account with Bank A. Additionally, a “customer” of Bank A includes an individual who is a cardholder of Bank A and may utilize the ATMs of Bank A by inserting their card, entering a PIN/passcode, etc. A “non-customer” refers to an individual, business, entity, etc. that has not registered as a checking/savings account holder with the financial institution associated with the ATM, is not a cardholder of the financial institution associated with the ATM, or the like. A “non-customer” does not have access to traditional services offered by the bank beyond basic public services or may only have access to services encumbered by non-customer restrictions (e.g., transaction limits, geographical limitations, additional fees, etc.). For example, a “non-customer” of Bank A includes an individual who is registered with and owns a checking/savings account with Bank B and not Bank A, an individual who is not a cardholder of Bank A, an individual who transacts with Bank A on a limited basis (e.g., via a non-customer banking channel of an ATM as disclosed herein) and the like.

Also, as used herein, a “non-customer banking channel” refers to a financial account offered by a provider institution that allows individuals and/or entities who are not existing customers of the provider institution to create a banking channel resembling a checking or deposit type account. The non-customer (or a customer that wishes to have both a customer account as well as a non-customer banking channel which may include restrictions unique to the non-customer banking channel) may create or otherwise establish the non-customer banking channel by providing non-customer account data (e.g., at an ATM). For example, a parent may be a customer of a provider institution and wish to create a non-customer account for a child, the non-customer account being accessible via an ATM located at or near the child's school.

The non-customer banking channel may be hosted on the ATM or associated with a particular ATM. For example, the non-customer banking channel may only be accessible via the ATM on which it was created or via a limited number of ATMs (such as ATMs at designated geographical locations). In this way, the non-customer banking channel may be provided on a specific ATM or tied to a particular group of ATMs. Further, the non-customer banking channel may store funds (e.g., a non-customer account balance) up to a non-customer account limit. The non-customer account limit may be a predetermined limit set by the provider institution or selected by the account creator. The ATM and/or the provider institution may charge fees associated with using the non-customer banking channel (e.g., fees associated with depositing to or withdrawing funds from the non-customer banking channel). Additionally, the non-customer banking channel may be converted to a customer account such as a checking account, a deposit account, a savings account, or the like by selecting a prompt, signing up, or otherwise registering with the provider institution (e.g., via the ATM, via a website of the provider institution, etc.).

Further, as used herein, "non-monetary media" refers to various non-monetary items that hold value or serve a functional purpose beyond their monetary equivalent. For example, non-monetary media may include phones, watches, jewelry, handbags, apparel, and the like. Non-monetary media may also refer to documents, letters, passports, tickets, coupons, etc.

Referring to FIG. 1, a system 100 for enabling ATM transactions for a customer and/or non-customer is shown, according to an example embodiment. The system 100 includes an ATM system 102 and a provider institution computing system 104. In some embodiments, the system 100 may include a user mobile device 106. The systems, devices, and/or components of the system 100 may be configured to communicate with each other over a network 110. The network 110 may include one or more of the Internet, cellular network, Wi-Fi®, Wi-Max, a proprietary banking network, or any other type of wired, wireless, or a combination of wired and wireless networks.

The ATM system 102 is an ATM computing system. In some embodiments, the ATM computing system 102 includes a network interface circuit (e.g., circuit 130) that is configured to provide an interface between a user (e.g., the customer, the non-customer) and the provider institution computing system 104 over the network 110. The ATM system 102 is configured to enable various ATM transactions for a customer of the financial institution, such as allowing the customer to view account balances, purchase stamps, deposit checks, transfer funds, withdraw funds from a given account in the form of cash or other physical currency, and so on. For example, the ATM system 102 can include an ATM card slot configured to receive an ATM card inserted by a customer. The ATM system 102 may include a currency dispenser that is used to dispense currency when a user wishes to perform a physical currency withdrawal. In some embodiments, the ATM system 102 is disposed at a brick-and-mortar banking facility associated with the provider/associated financial institution. In some embodiments, the ATM system 102 is a standalone computing terminal (e.g., disposed at an unrelated retail facility, within an office building, etc.).

In addition to traditional customer transactions, the ATM system 102 of the present disclosure is configured to enable various expanded functionalities for customers, non-customers, or both customers and non-customers (e.g., any user of the ATM). For example, the ATM system 102 may provide non-monetary storage services for customers and non-customers of the financial institution. The ATM system 102 may include a media aperture that is configured to receive non-monetary media, physical items, and the like such as keys, mobile phones, jewelry, apparel/accessories, etc. In this way, the ATM system 102 may temporarily serve as a secure storage repository for non-monetary media until retrieved by the customer or the non-customer. In some embodiments, the ATM system 102 may allow customers and non-customers to deposit non-monetary media into the storage repository in exchange for paper currency or other monetary items (e.g., trade in an old cell phone, electronic device, etc. in exchange for physical currency, account credits, or the like). In still further embodiments, the ATM system 102 may be configured to allow customers and non-customers to lease, rent, or temporarily receive non-monetary media from the storage repository (e.g., rent hotel/vehicle keys for temporary use until returned to the ATM, receive/return access cards, keycards, and the like, etc.). As another example, the ATM system 102 may be configured to allow customers and non-customers to donate funds into accounts associated with third parties (e.g., serve as "donation/deposit boxes" through which customers and non-customers can provide funds for charitable organizations, fundraisers, and the like).

The ATM system 102 may also be configured to enable expanded functionalities directed to non-customers, such as allowing non-customers to cash checks drawn on a third-party institution or allowing non-customers to utilize a limited banking channel operated by the provider institution and hosted, enabled, or otherwise associated with at least one specific ATM.

In the example shown, the ATM system 102 includes a network interface circuit 130, a processing circuit 132, an input/output circuit 138, a non-customer management circuit 142, and a vault control circuit 144.

Figure 9:
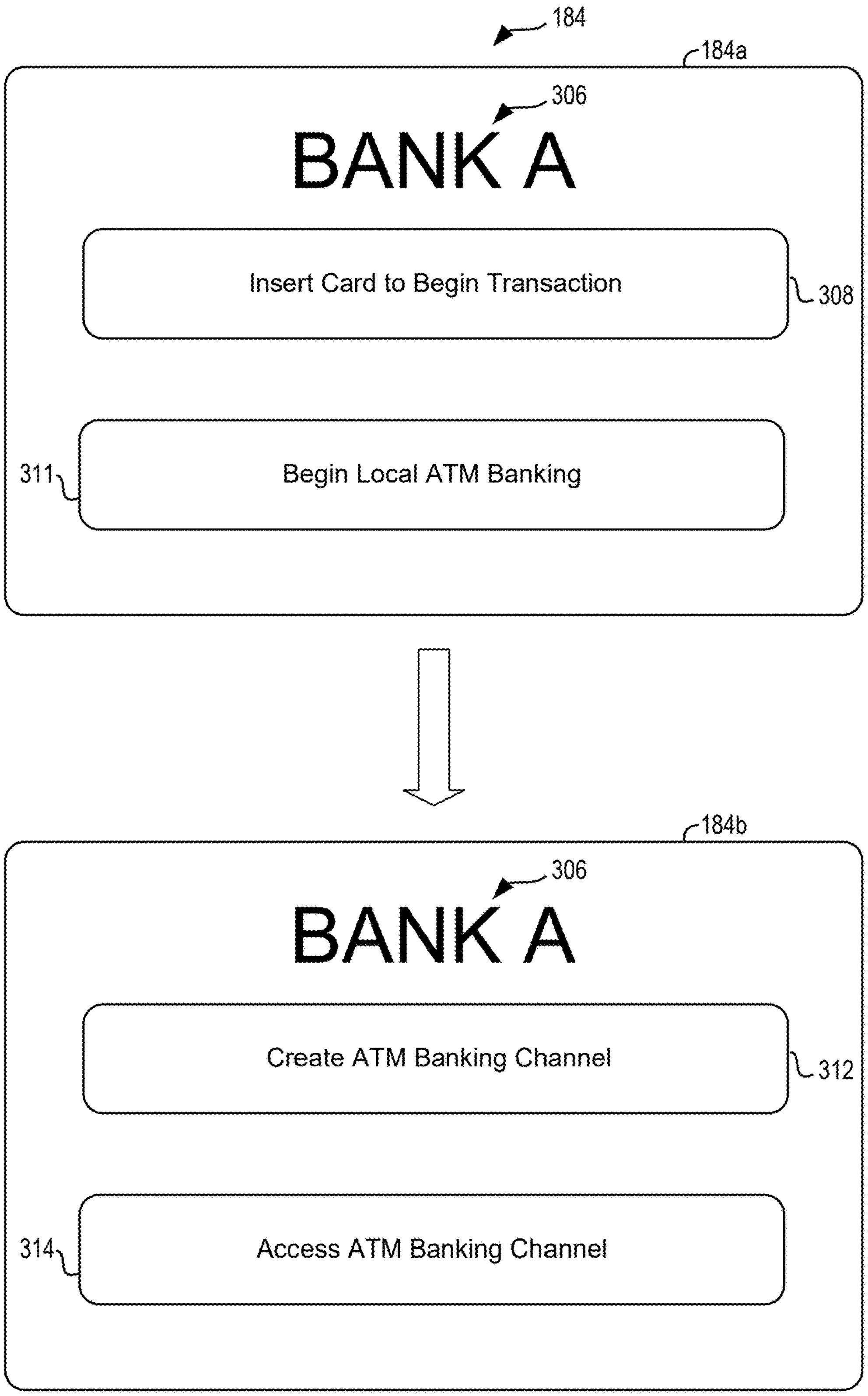
FIG. 9 illustrates example user interfaces of an ATM, according to an example embodiment.

The network interface circuit 130 is configured or structured to establish connections via the network 110 between the ATM system 102 and the provider institution computing system 104 and/or the user mobile device 106. In some embodiments, as shown in FIG. 9, the network interface circuit 130 may be configured to establish communications via the network 110 with a third-party computing system 402, such as a computer system of a third-party financial institution that is not a provider of the ATM, a computer system of a credit union, a computer system of a non-bank financial institution, etc. Thus, in this embodiment, the ATM is a network-connected ATM.

The processing circuit 132 includes at least one processor 134 and at least one memory 136. The memory 136 is structured to retrievably store information regarding accounts held by various users. The accounts may include a checking account held by the customer and accessible via the user mobile device 106, a non-customer banking channel associated with the ATM, accounts of charities/organizations configured to receive deposits in the form of donations from ATM users, or other suitable accounts. For instance, the memory 136 may store information related to the financial account of the user, such as authentication information (e.g., username/password combinations, personal identification numbers (PINs), device authentication tokens, security question answers, account information, balances, biometric data, etc.). Furthermore, the memory 136 may store any other information that may be encountered in the operation of an ATM with expanded functionalities for customers and non-customers or otherwise referenced herein, such as user preferences and other information comprising a user profile, transaction history, etc. The processing circuit 132 may perform or assist in performing any of the operations, steps, or methods discussed herein.

In some embodiments, the network interface circuit 130 may include one or more antennas or transceivers and associated communications hardware and logic (e.g., computer code, instructions, etc.). The network interface circuit 130 may also include program logic that is structured to allow the ATM system 102 to access and couple/connect to the network 110 to, in turn, exchange information with for example the provider institution computing system 104, the user mobile device 106, third-party computing systems 402, and/or other ATM systems (and potentially other systems/devices). That is, the network interface circuit 130 is coupled to the processor 134 and memory 136 and configured to enable a coupling to the network 110. The network interface circuit 130 allows for the ATM system 102 to transmit and receive data over the network 110. Accordingly, the network interface circuit 130 includes any one or more of a cellular transceiver, a wireless network transceiver, and a combination thereof. Thus, the network interface circuit 130 enables connectivity to WAN as well as LAN. Further, in some embodiments, the network interface circuit 130 includes cryptography capabilities to establish a secure or relatively secure communication session between other systems such as the provider institution computing system 104, a second ATM system, the user mobile device 106, etc. In this regard, information (e.g., account information, login information, financial data, digital objects, and/or other types of data) may be encrypted and transmitted to prevent or substantially prevent a threat of hacking or other security breach.

The input/output circuit 138 is structured to receive communications from and provide communications to other computing devices, users, and the like associated with the ATM computing system 102. The input/output circuit 138 is structured to exchange data, communications, instructions, and the like with an input/output device of the components of the system 100. In some embodiments, the input/output circuit 138 includes communication circuitry for facilitating the exchange of data, values, messages, and the like between the input/output circuit 138 and the components of the ATM computing system 102. In some embodiments, the input/output circuit 138 includes machine-readable media for facilitating the exchange of information between the input/output circuit 138 and the components of the financial institution computing system 104, the user mobile device 106, and/or the third-party computing system 402. In some embodiments, the input/output circuit 138 includes any combination of hardware components, communication circuitry, and machine-readable media.

In some embodiments, the I/O circuit 138 may include a network interface. The network interface may be used to establish connections with other computing devices by way of the network 110. The network interface may include program logic that facilitates connection of the ATM computing system 102 to the network 110. In some embodiments, the network interface may include any combination of a wireless network transceiver (e.g., a cellular modem, a Bluetooth transceiver, a Wi-Fi transceiver) and/or a wired network transceiver (e.g., an Ethernet transceiver). For example, the I/O circuit 138 may include an Ethernet device such as an Ethernet card and machine-readable media such as an Ethernet driver configured to facilitate connections with the network 110. In some embodiments, the network interface includes the hardware and machine-readable media sufficient to support communication over multiple channels of data communication. Further, in some embodiments, the network interface includes cryptography capabilities to establish a secure or relatively secure communication session in which data communicated over the session is encrypted.

In some embodiments, the I/O circuit 138 includes suitable input/output ports and/or uses an interconnect bus for interconnection with a local display (e.g., a liquid crystal display, a touchscreen display) and/or keyboard/mouse devices (when applicable), or the like, serving as a local user interface for programming and/or data entry, retrieval, or other user interaction purposes. As such, the input/output circuit 138 may provide an interface for the user to interact with various applications and/or executables stored, hosted, or otherwise provided on the ATM computing system 102 and/or the provider institution computing system 104. For example, the input/output circuit 138 may include a keyboard, a keypad, a mouse, joystick, a touch screen, a microphone, a biometric device, a virtual reality headset, smart glasses, and the like. As another example, input/output circuit 138, may include, but is not limited to, a television monitor, a computer monitor, a printer, a facsimile, a speaker, and so on.

The non-customer management circuit 142 is structured to manage, operate, and otherwise enable transactions and functionalities directed to non-customers of the provider institution associated with the ATM. In this way, the non-customer management circuit 142 enables the ATM to provide certain banking services to individuals who do not hold traditional accounts (e.g., checking accounts, savings accounts, etc.) with the bank associated with the ATM. The non-customer management circuit 142 may store information indicative of non-customer banking channels hosted and/or accessible via the ATM. For example, the non-customer management circuit 142 may receive user data from non-customers via an input device of the ATM and send the user data to the processing circuit 132 and/or the provider institution computing system 104 in order to create a banking channel associated with a non-customer, perform transactions associated with a non-customer banking channel, receive deposits from non-customers directed to third-party accounts, and/or cash checks of non-customers drawn on a third-party institution.

The non-customer management circuit 142 may identify and authenticate non-customers of the bank by providing temporary access codes, one-time-use tokens, or other authentication credentials to the non-customers to ensure the security of transactions. The non-customer management circuit 142 may also enable the ATM to open a banking channel for a non-customer. The non-customer banking channel may allow the non-customer to perform certain transactions, such as cash withdrawals, balance inquiries, or other limited banking services. The limited banking services may be subject to non-customer restrictions such as deposit/withdrawal caps, additional fees for processing transactions, geographic limitations of service, and the like. In some embodiments, the non-customer banking channel may only be accessible on one or more designated ATMs. Additionally, the non-customer management circuit 142 may facilitate check cashing for non-customers, including cashing checks drawn on third party institutions. In this way, the non-customer management circuit 142 may communicate with the provider institution computing system 104 and/or a third-party institution computing system 402 to verify the authenticity of the check, confirm the identity of the individual presenting the check, and dispense the appropriate amount of currency.

Figure 2:
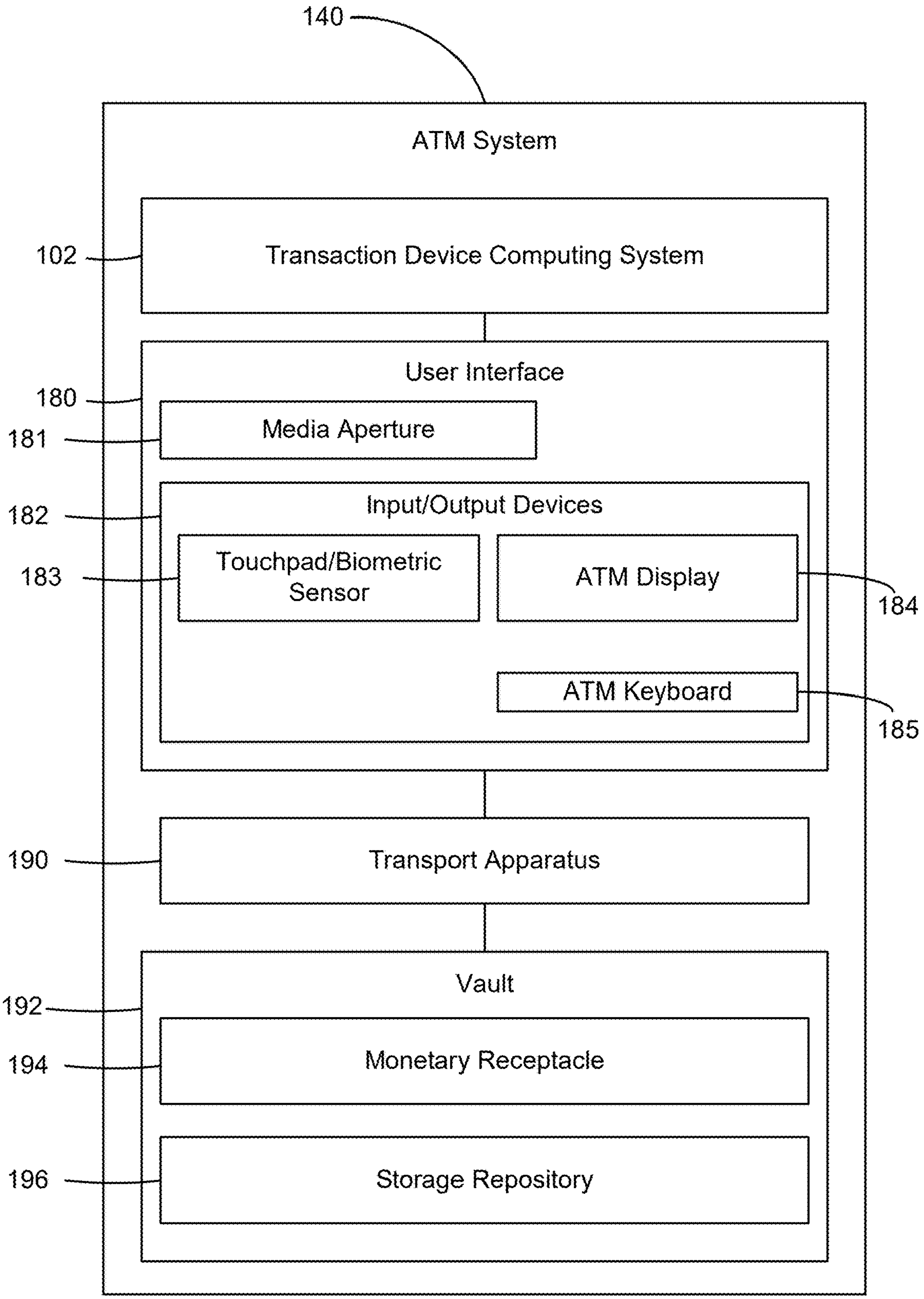
FIG. 2 is a is a block diagram of an ATM system, according to an example embodiment.

The vault control circuit 144 is configured to manage the security, access, and operation of a vault of the ATM. The vault is a secure compartment within the ATM that may house physical currency, active/inactive transaction cards, other monetary items, and/or non-monetary media. As shown in FIG. 2, the vault 192 may include a monetary receptacle 194 for storing physical currency and other monetary items. Similarly, the vault 192 may include a storage repository 196 configured to securely receive, provide, and/or store non-monetary media such as keys, phones, jewelry, and the like. The vault control circuit 144 may enable access to and from the vault 192 by customers, non-customers, and/or technicians/providers of the ATM. The vault control circuit 144 may receive passcodes, commands, or other inputs or otherwise be configured to allow a technician to access the vault 192 (e.g., to re-supply the ATM with physical currency) and/or may regulate customer and non-customer access to items or currency stored in the vault 192. For example, the vault control circuit 144 may operate, command, or otherwise control at least one transport apparatus 190 that may selectively deposit or withdraw currency and/or non-monetary media from the vault 192 during a transaction at the ATM. In some embodiments, the vault control circuit 144 may monitor the status/identify of the contents of the vault 192 and provide information regarding the vault 192 to the processing circuit 132 and/or the provider institution computing system 104. For example, the vault control circuit 144 may track an amount of funds present in the monetary receptacle 194, an occupied/unoccupied status of each non-monetary storage repository 196, an identity of non-monetary media stored in the ATM, and/or a percentage of available storage space within the vault 192, among other information.

The provider institution computing system 104 is a computing system associated with an entity or provider institution, such as a financial institution, capable of maintaining user accounts (e.g., ATM card accounts, non-customer banking channels, etc.) and databases of user information. In the example shown, the provider institution is a financial institution. The financial institution may include commercial or private banks, credit unions, investment brokerages, or other financial institutions. The provider institution computing system 104 may maintain a plurality of user accounts having various information. In the example shown, the provider institution is an issuer of ATM cards (e.g., a debit card) for customers of the financial institution to use at the ATM. Additionally, the provider institution, via the system 100 and ATM computing system 102, provides functionalities for non-customers at the ATM as discussed herein. For example, the provider institution provides non-customer banking channels hosted/associated with one or more specific ATMs. Additionally, the provider institution provides access to ATM storage repositories for non-currency physical media, provision of transactions (e.g., donations) to third parties without requiring a user to have an account at the financial institution, etc.

Also, in the example shown, the provider institution computing system 104 is structured as a backend computing system that may comprise one or more servers. The financial institution may provide or support the ATM computing system 102 (e.g., manufacture or cause manufacturing of the ATM computer system 102 and ATM, enable access to accounts maintained by the provider institution computing system 104 via the ATM computing system 102, etc.). In some embodiments, the provider institution computing system 104 is structured to permit, enable, facilitate, manage, process, and allow ATM transactions via communication with the user mobile device 106 and/or the ATM system 102. The provider institution computing system 104 may store information relating to a user account as it may be used to execute an ATM transaction via the ATM computing system 102. For example, the provider institution computing system 104 may store information relating to checking accounts, savings accounts, withdrawals of funds, deposits of funds, non-customer banking channels, storage/exchanges of non-monetary media, and so on. In this way, the provider institution computing system 104 may store or receive information from the non-customer management circuit 142 of the ATM relating to non-customer use of the ATM computing system 102. Examples of information relating to non-customer use of the ATM computing system 102 include non-customer banking channels hosted, supported, or maintained on the financial institution computing system 104 and/or the ATM computing system 102, data/access codes/identifiers associated with non-monetary physical media stored within an ATM or exchanged at an ATM for currency, and the like. As will be appreciated, the level of functionality that resides on the provider institution computing system 104 as opposed to the ATM computing system 102 may vary depending on the implementation of this disclosure. As shown, the provider institution computing system 104 includes a network interface circuit 150, a processing circuit 152, an accounts database 155, an accounts management circuit 158, an input/output circuit 159, and an authentication circuit 160.

The network interface circuit 150 is structured to couple to the network 110 to enable communications with the user mobile device 106 and/or the ATM computing system 102, among potentially other systems and devices. In some embodiments, the network interface circuit 150 includes programming and/or hardware-based components that connect the provider institution computing system 104 to the network 110. The network interface circuit 150 may be coupled to the processing circuit 152 to enable the processing circuit 152 to receive and transmit messages, data, and information via the network 110. In some embodiments, the network interface circuit 150 may include one or more antennas or transceivers and associated communications hardware and logic (e.g., computer code, instructions, etc.). The network interface circuit 150 may also include program logic that is structured to allow the provider institution computing system 104 to access and couple/connect to the network 110 to, in turn, exchange information with for example the user mobile device 106 and/or the ATM computing system 102 (and potentially other systems/devices). The network interface circuit 150 allows for the provider institution computing system 104 to transmit and receive data over the network 110. Accordingly, the network interface circuit 150 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver and a wireless transceiver). Thus, the network interface circuit 150 enables connectivity to WAN as well as LAN (e.g., Bluetooth, near field communication (NFC), etc. transceivers). Further, in some embodiments, the network interface circuit 150 includes cryptography capabilities to establish a secure or relatively secure communication session between other systems such as the user mobile device 106, the ATM computing system 102, etc. In this regard, information (e.g., account information, login information, financial data, digital objects, and/or other types of data) may be encrypted and transmitted to prevent or substantially prevent a threat of hacking or other security breach. To further support features of or interaction with the provider institution computing system 104, the network interface circuit 150 may provide a relatively high-speed link to the network 110.

The at least one processing circuit 152 is shown to include at least one processor 154 and at least one memory 156 and may be communicably connected to the network interface circuit 150, the accounts management circuit 158, the input/output circuit 159, and the authentication circuit 160. The memory 156 includes one or more memory devices (e.g., RAM, NVRAM, ROM, Flash Memory, hard disk storage) that store data and/or computer code for facilitating the various processes described herein. That is, in operation and use, the memory 156 stores at least portions of instructions and data for execution by the processor 154 to perform various operations. The memory 156 may be or include tangible, non-transient volatile memory and/or non-volatile memory. The processor 154 may be implemented as one or more processors, application specific integrated circuits (ASIC), one or more field programmable gate arrays (FPGAs), a digital signal processor (DSP), a group of processing components, or other suitable electronic processing components. The processing circuit 152 may perform or assist in performing any of the operations, steps, or methods discussed herein.

The memory 156 may include an accounts database 155. The accounts database 155 is structured to retrievably store information regarding accounts held by customers and non-customers of the provider institution. For example, the accounts database 155 may store information regarding a debit account held by a customer of the financial institution. The accounts database 155 may also store information regarding a banking channel associated with a non-customer of the financial institution and provided via the ATM computing system 102 and/or the user mobile device 106. For instance, the accounts database 155 may store information related to the user, the user mobile device 106, and/or the ATM computing system 102 such as authentication information (e.g., username/password combinations, device authentication tokens, security question answers, OTPs, PINs, biometric information, etc.), user information (e.g., name, date of birth, etc.), account information (e.g., account number, balance information, expiration date, etc.), banking channel information (e.g., quantity of funds deposited, banking channel balance limit, ATMs permitted to access/host the banking channel, etc.), identifiers of ATM storage repositories that are occupied/unoccupied, logs of items received via ATM storage repositories in exchange for currency, and so on. The accounts database 155 may store within the user's client account all or mostly all of the items that the user has registered with the provider institution computing system 104, including customer and/or non-customer data (such as user profiles with customer/non-customer personal information, account/banking channel numbers, bill and payment histories, communications sent and received from the customer/non-customer, etc.). In various embodiments, the accounts database 155 is structured as one or more remote data-storage facilities (e.g., cloud servers). In some embodiments, the accounts database may be located in whole or in part on the ATM computing system 102.

The accounts management circuit 158 is structured to manage the financial accounts and banking channels of various users, including maintaining and handling transaction processing for one or more financial accounts or banking channels of the users. Accordingly, the accounts management circuit 158 is configured to process payments made from an account of the user held at the financial institution associated with the financial institution computing system 104. Further, the accounts management circuit 158 is configured to process deposits/withdrawals that a non-customer makes into/from the non-customer's banking channel via the ATM computing system 102 and/or the user mobile device 106. In some embodiments, the accounts management circuit 158 is further configured to interface with the ATM non-customer management circuit 142 such that the accounts management circuit 158 provides interfaces, displays, and associated content to enable non-customers to manage banking channels provided via the ATM computing system 102 associated with the financial institution computing system 104. In further embodiments, the accounts management circuit 158 is further configured to interface with ATM vault control circuit 144 such that the accounts management circuit 158 provides interfaces, displays, and associated content to enable customers and/or non-customers to store/retrieve non-monetary physical media within an ATM or exchange/receive non-monetary media at the ATM for currency, account credits, or the like. In still further embodiments, the accounts management circuit 158 is configured to manage financial accounts of entities, individuals, organizations, charities, or other suitable parties that may receive deposits from customers and/or non-customers (e.g., donations) at one or more designated ATMs, one or more ATMs within a designated geographic region, etc.

Like the input/output circuit 138, the input/output circuit 159 is structured to receive communications from and provide communications to other computing devices, users, and the like associated with the financial institution computing system 104. The input/output circuit 159 is structured to exchange data, communications, instructions, and the like with an input/output device of the components of the system 100. In some embodiments, the input/output circuit 159 includes any combination of hardware components, communication circuitry, and machine-readable media for facilitating the exchange of data, values, messages, and the like between the input/output circuit 159 and the components of the financial institution computing system 104 and/or the system 100. In some embodiments, the I/O circuit 159 may include a network interface. The network interface may be used to establish connections with other computing devices by way of the network 110. In some embodiments, the network interface includes the hardware and machine-readable media sufficient to support communication over multiple channels of data communication. Further, in some embodiments, the network interface includes cryptography capabilities to establish a secure or relatively secure communication session in which data communicated over the session is encrypted. In some embodiments, the I/O circuit 159 includes suitable input/output ports and/or uses an interconnect bus for interconnection with a local display (e.g., a liquid crystal display, a touchscreen display) and/or keyboard/mouse devices (when applicable), or the like, serving as a local user interface for programming and/or data entry, retrieval, or other user interaction purposes. As such, the input/output circuit 159 may provide an interface for the user to interact with various applications and/or executables stored on the provider institution computing system 104.

The authentication circuit 160 is configured to verify that users attempting to access the ATM to perform transactions are legitimate account holders or are legitimate non-customers associated with banking channels of the ATM. In this way, the authentication circuit 160 is configured to prevent unauthorized access to customer accounts (e.g., checking accounts, saving accounts, etc.) and non-customer accounts (e.g., non-customer banking channels). The authentication circuit 160 may receive input data from the ATM such as account numbers, account identifiers, username and password combinations, passcodes, biometric data and the like related to the identity of the ATM user. The authentication circuit 160 may compare data received from an ATM user with user information stored in the accounts database 155 of the financial institution computing system 104. The authentication circuit 160 may also permit access to specific ATM functionalities based on respective user account data, privileges, and status as a customer/non-customer. For example, the authentication circuit 160 may permit a customer to withdraw cash, check an account balance, or perform other authorized transactions and may direct a non-customer to open a non-customer banking channel or access an already existing non-customer banking channel. The authentication circuit 160 may also store or track information about user access, authentication attempts, and transaction details associated with one or more ATMs (e.g., whether a user attempts to access a non-customer banking channel associated with a designated ATM at an undesignated ATM, etc.). Additionally, the authentication circuit 160 may obtain information from various sources (e.g., by sending a text to the user mobile device 106 with a verification code, by receiving inputs from the ATM, etc.) to authenticate a new user of the ATM system 102.

The authentication circuit 160 may also generate, send, and/or verify authentication credentials associated with transactions involving non-monetary media at one or more ATMs. For example, a user may deposit a non-monetary item for storage in the storage repository 196 of the ATM. The authentication circuit 160 may generate a passcode, a username and password combination, a quick access (QR) code, a token, or other suitable authentication credentials specific to the non-monetary media deposited. In some embodiments, the authentication circuit may initiate a near field communication (NFC) between the ATM and a mobile device 106 of the user. The authentication circuit 160 may require the ATM and mobile device 106 be within a proximity of each other (e.g., 10 cm, 20 cm, etc.) in order to process an NFC tap of a token associated with the ATM to the mobile device 106. In this way, the user who deposited the non-monetary media may subsequently present the authentication credentials (e.g., passcode, QR code, subsequent NFC communication, etc.) to the ATM to retrieve the non-monetary physical media.

The user mobile device 106 may include a mobile device associated with an ATM user. The user may be one or more individuals (e.g., a customer, a non-customer), business entity representatives, government entity representatives, and so on. The user mobile device 106 is structured to exchange data over the network 110, execute software applications, access websites, generate graphical user interfaces, and perform other operations described herein. The user mobile device 106 may include one or more of a smartphone or other cellular device, a wearable computing device (e.g., a watch or bracelet, etc.), a tablet, a portable gaming device, a laptop, and other portable computing devices. In some embodiments, the user device 106 may be a stationary computing device, such as a desktop computer. The user mobile device 106 includes a network interface circuit 162, an input/output circuit 164, a display device 166, and a processing circuit 168. The network interface circuit 162 is configured or structured to establish connections via the network 110 between the user mobile device 106, the ATM computing system 102, and the provider institution computing system 104 similar to the network interface circuits discussed above. The processing circuit 168 includes a processor 170 and a memory 172. The processing circuit 168 may be communicably coupled to the ATM system 102 and/or the financial institution computing system 104.

The input/output circuit 164 is structured to receive communications from and provide communications to the user of the user mobile device 106 associated with a transaction at the ATM. The input/output circuit 121 includes hardware and associated logic (e.g., instructions, computer code, etc.) to enable the user mobile device 106 to exchange information with a user and other devices (e.g., the provider institution computing system 104, the ATM computing system 102) that may interact with the user mobile device 106. The input/output circuit 164 may provide information to access a banking channel hosted on the ATM computing system 102 created by and for the non-customer. The information may also authentication credentials including a passcode, key, command, or the like to retrieve non-monetary physical media deposited by the customer or non-customer into a repository of the ATM.

The input/output circuit 164 may include any combination of hardware components, for example, a mechanical keyboard, a touchscreen, a microphone, a camera, a fingerprint scanner, a device that is able to be coupled to the user mobile device 106 via a connection (e.g., USB, serial cable, Ethernet cable, etc.), and so on. The output aspect of the input/output circuit 164 allows the user to receive information from the user mobile device 106, and may include, for example, a digital display, a speaker, illuminating icons, light emitting diodes ("LEDs"), and so on. Thus, the input/output circuit 164 may include systems, components, devices, and apparatuses that serve both input and output functions; only input functions; and/or only output functions. The input/output circuit 164 may include communication circuitry for facilitating the exchange of data, values, messages, and the like between an input and/or output device and the components of the user mobile device 106.

In some embodiments, the display device 166 may be a screen, such as a touchscreen or another display device. The user mobile device 106 may communicate information to the user via the display device 166 and/or to receive communications from the user (e.g., through a keyboard provided on the display device 166). In some embodiments, the display device 166 may be a component of the input/output circuit 164, as described above.

Figure 3:
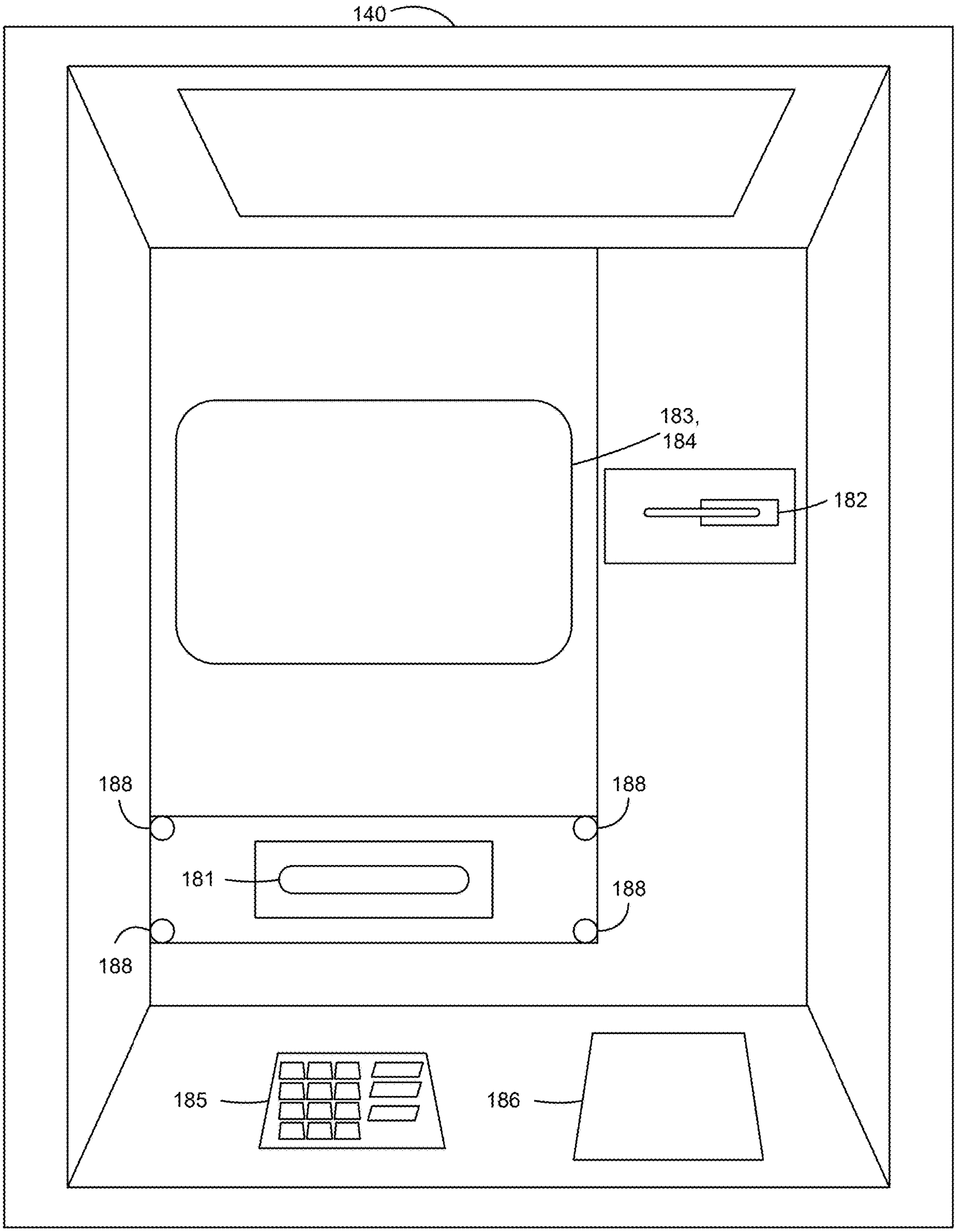
FIG. 3 is a front elevated view of the ATM system of FIG. 2, according to an example embodiment.
Figure 4:
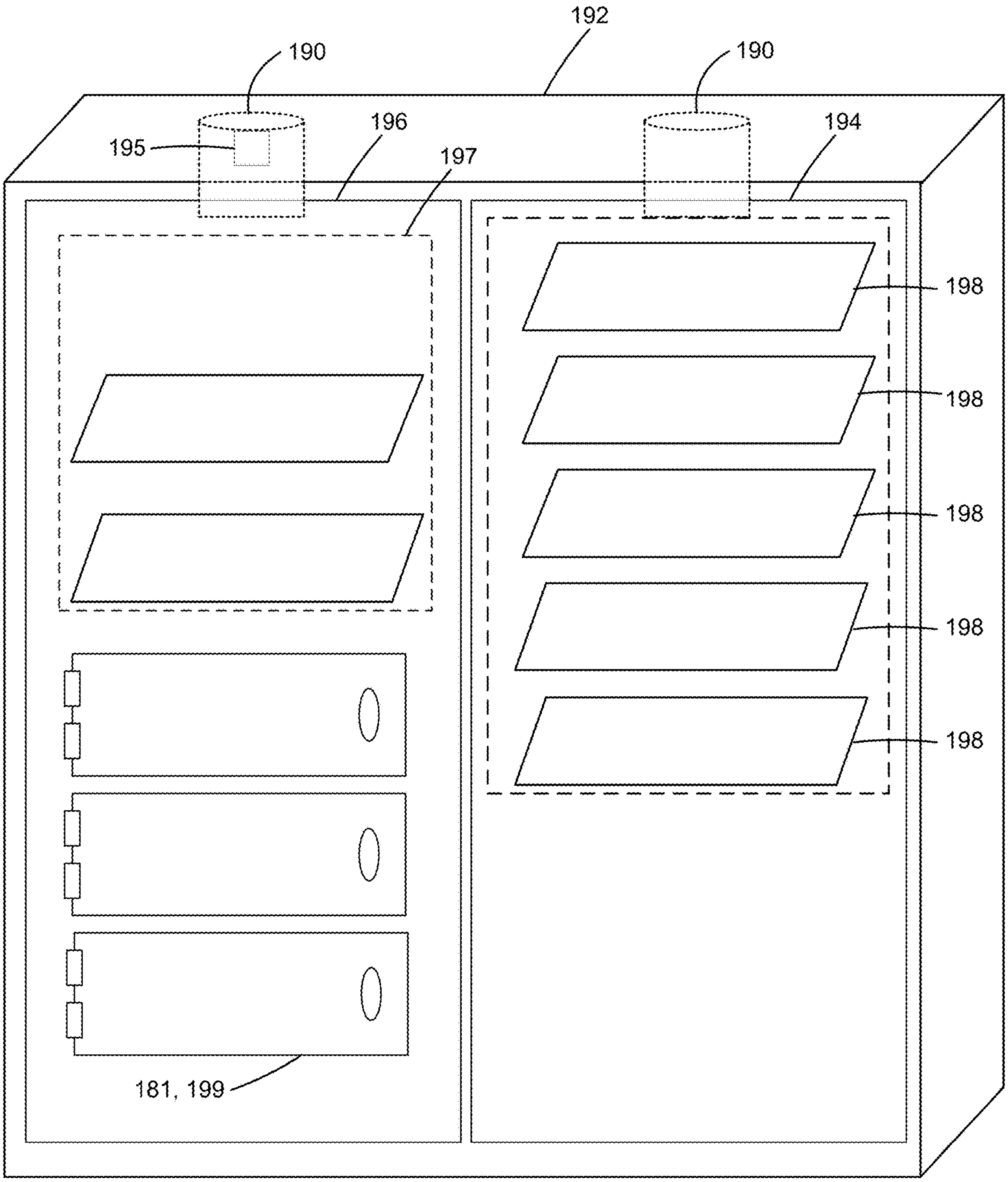
FIG. 4 is a front lower view of the transaction device of FIG. 2 with certain internal zones shown within dashed boxes, according to an example embodiment.

Turning to FIG. 2, a block diagram illustrating an example transaction device 140 (e.g., an ATM) is shown, according to an embodiment. The transaction device 140 may include an ATM system (for example, as depicted in FIGS. 3-4), a standalone terminal/kiosk, or another suitable computing system capable of performing the transactions disclosed herein. The transaction device 140 includes the transaction device computing system (e.g., the ATM system 102) shown in FIG. 1. The transaction device 140 may also comprise a user interface 180, a transport apparatus 190, and a vault 192.

The user interface 180 may include at least one media aperture 181 and input/output devices 182. The media aperture 181 is configured to receive non-monetary media into the storage repository 196 of the transaction device 140. Additionally, the media aperture 181 may retrieve non-monetary media from the storage repository 196 and provide the non-monetary media to a user of the transaction device 140. In still further embodiments, the media aperture 181 may be configured to allow access to and from the storage repository 196. For example, the media aperture 181 may include a slot, a door, a drop-box, a conveyor, an arm and movable appendage, one or more rollers, a window configured to open and close, or another suitable device for receiving or dispensing non-monetary media. In additional embodiments, each media aperture 181 may be structured to receive and/or dispense a specific type of non-monetary media (e.g., phones, passports, documents, letters, jewelry, etc.). For example, phones may be inserted via a media aperture 181 comprising a slot, while larger non-monetary items like handbags may be inserted via a media aperture 181 comprising a door and lock. In some embodiments, the media aperture 181 is a media pocket and a user (e.g., a customer or a non-customer) can retrieve and/or place non-monetary media from/in the media pocket. In some embodiments, the media aperture 181 is operable between an open position and a closed position and/or a locked state and an unlocked state. For example, the media aperture 181 may be operable to the open position when receiving or dispensing non-monetary media and operable to the closed position when the transaction device 140 is inactive/storing the non-monetary media.

The user interface 180 may also include one or more input/output devices 182. The input/output devices 182 are configured to allow the user to interact with the transaction device 140 by submitting user data, making selections on the transaction device, depositing monetary items and/or non-monetary media, withdrawing monetary items and/or non-monetary media, receiving information from the transaction device 140, authenticating and providing security information to transaction device 140, and otherwise enabling a user to operate/navigate the functionalities of the transaction device 140. For example, the input/output devices 182 may include a card reader structured to receive an input from a transaction card (e.g., an ATM card, a credit card, a debit card, a gift card) and/or a security card (e.g., an identification card). The input devices may be configured to read a RFID signal, a magnetic strip, a security chip, and/or any other input signal. In some embodiments, the I/O devices 182 may include a keypad, keyboard, touchscreen, speaker, microphone, or other typing device structured to receive a user input including an alphanumeric input, or other touch input. In some embodiments, the I/O devices 186 includes a biometric sensor structured to receive a biometric from a user such as a fingerprint scan, an eye scan, a face scan, and the like. The I/O devices 182 may further include a screen, a display, a device (e.g., a mobile device 106) communicatively coupled to the transaction device 140, or other suitable devices.

The vault 192 may include a secure housing defining an area within the transaction device 140 that may include a monetary receptacle 194 and a storage repository 196. The vault 192 may divided into one or more compartments that define the monetary receptacle 194 and/or the storage repository 196. In some embodiments, the monetary receptacle 194 and the storage repository may be located in the same compartment of the vault 192 or otherwise share space within the transaction device 140. The monetary receptacle may be configured to receive and sort physical currency by denomination, receive, read, cash, and/or otherwise process checks or other monetary items. The storage repository 196 may be configured to receive any type of non-monetary media. The storage repository may be accessible via one or more media apertures 181. For example, the storage repository 196 may include a door and be configured in a manner similar to a safety deposit box integrated into the transaction device 140. In some embodiments, the storage repository 196 may include one or more internal compartments configured to receive and dispense non-monetary media. For example, the storage repository 196 may include one or more chambers, racks, cartridges, shelfs, etc. for storing keys, phones, jewelry, documents, letters, and the like.

The transport apparatus 190 is configured to securely transport currency items, non-monetary media, and/or both to the monetary receptacle 194 and the storage repository 196, respectively. For example, the transport apparatus 190 may include a lift, arm, tube, conveyor, or other device operable to receive currency and/or non-monetary media, deliver the currency and/or non-monetary media to the vault 192, retrieve the currency and/or non-monetary media from the vault 192, and provide the currency or non-monetary media to the user of the transaction device 140.

Turning to FIG. 3, a front elevated view of a transaction device 140 is illustrated, according to an example embodiment. As shown in FIG. 3, the transaction device 140 includes at least one media aperture 181, a display screen 184 (e.g., an input/output device 182 which may include touchpad 183 functionality), and one or more other input/output devices 182. As shown in FIG. 3, the input/output devices 182 may include a card reader, a keyboard or keypad 185, a touch screen, biometric input, a QR reader 186, and the like. Various other input output devices 182 may also be included such as a currency input/dispenser, a receipt dispenser, etc.

The transaction device 140 also includes the at least one media aperture 181. In some embodiments, the transaction device 140 also includes one or more mounting devices 188 configured to couple the media aperture 181 or a component associated with the media aperture 181 (e.g., a housing, a chute/panel leading to the vault 192, etc.) to the transaction device 140. In some embodiments, the transaction device 140 may include more than one media aperture 181. For example, as shown in FIGS. 3 and 4, the media apertures 181 may include a slot, input tray, drawer, or other suitable device on an elevated portion of the transaction device 140 and may include one or more doors 199 configured to selectively allow access to the storage repository 196 on a lower portion of the transaction device 140.

The display screen 184 is a display output structured to display a user interface. The user interface (UI) may include a transactional UI structured to facilitate a transaction. The transactional UI may be displayed during transaction operations performed by the transaction device 140. The UI may also include a service mode UI structured to facilitate a service operation (e.g., may allow a technician or provider to access the monetary receptable and/or storage compartment to conduct maintenance, etc.). The transactional UI may include any number of interactive elements or icons for facilitating the services for storing non-monetary media.

The I/O devices 182, 185, 186 may include at least one I/O device for facilitating an operation (e.g., a transactional operation and/or a service mode operation) at the transaction device 140. The one or more mounting devices 188 may include any combination of fasteners, pins, magnets, snap fit devices, holes, and/or receptacles for coupling the media aperture 181 to the transaction device 140.

FIG. 4 is an internal view of a lower portion of the transaction device 140 of FIG. 3, according to an example arrangement. As shown in FIG. 4, the transaction device 140 includes a vault 192 defined in the lower portion. The vault 192 includes, in this example, two compartments, one configured as a monetary receptacle 194, and the other configured as a storage repository 196 for non-monetary media. The monetary receptacle 194 may include one or more cassette slots 198 for receiving physical currency, banknotes, and the like. In some embodiments, the one or more transaction device transport apparatus 190 is coupled to the monetary receptacle 194 and/or the storage repository 196.

As shown in FIG. 4, the storage repository 196 may include multiple compartments configured to store respective non-monetary media. For example, the example storage repository 196 of FIG. 4 includes three doors 199 (e.g., media apertures 181) that may each lead to a separate compartment configured to securely store non-monetary media for a customer or non-customer. In this way, the compartments including doors 199 may be used to retrievably store non-monetary media. Also shown in FIG. 4, the storage repository 196 may also define an area 197 accessible only via the transport apparatus 190. In this way, the transport apparatus 190 may prevent users from reaching inside or otherwise gaining direct access to the area 197 of the storage repository 196. For example, the area 197 may include a compartment configured to irretrievably receive and store non-monetary media until accessed by a technical or provider representative. For example, a user may insert a cell phone that the user wishes to exchange for currency. The media aperture 181 may accept the cell phone, and the ATM may verify the identity of the cell phone. Once verified, the transport apparatus 190 may deposit the cell phone in a holding chamber such as area 197 and dispense currency for the user. A technician or provider representative may then later collect the accumulated items in the area 197. In some embodiments, the storage repository 196 may be configured to communicate to the processing circuit 132 and/or the provider institution computing system 104 regarding the amount of space available within the storage repository 196. For example, sensors may detect the presence of one or more objects in the storage repository, a weight of objects in the storage repository, or the like, and correlate the weight or number of objects with a percentage of capacity occupied by non-monetary media. The processing circuit 132 may then send an alert to the provider institution indicating that a collection operation should occur to collect deposited items and provide additional space for non-monetary media.

Further, in some embodiments, the transaction device 140 may include one or more sensors 195. The sensors 195 may be configured to collect data indicative of an identity of the at least one non-monetary media. For example, the sensors may include cameras, RFID readers, QR scanners, barcode scanners, imaging and vision systems, or other sensors configured to collect data indicative of the identity of the non-monetary media. The data may include a shape, color, weight, size, product number, electrical reading, produce code, photograph, or other information to confirm the identity of the non-monetary media. In some embodiments, the transaction device 140 may flash, light up, trigger a sound, or otherwise contact an attendant to arrive at the transaction device 140 and manually confirm the identity of the non-monetary media. The transaction device 140 may then receive the at least one non-monetary media in the storage repository, and responsive to identifying the at least one non-monetary media, provide the user with a monetary value associated with the identified non-monetary media (e.g., via the output device such a currency dispenser). The transaction device 140 may be configured to receive one or more predefined non-monetary media and correlate the identified non-monetary media with an associated currency value by looking up the non-monetary media in a look-up table, performing a search of a price catalog or market rate for the non-monetary media via a communication channel, or via another heuristic such as an AI cost approximation or the like.

Figure 5:
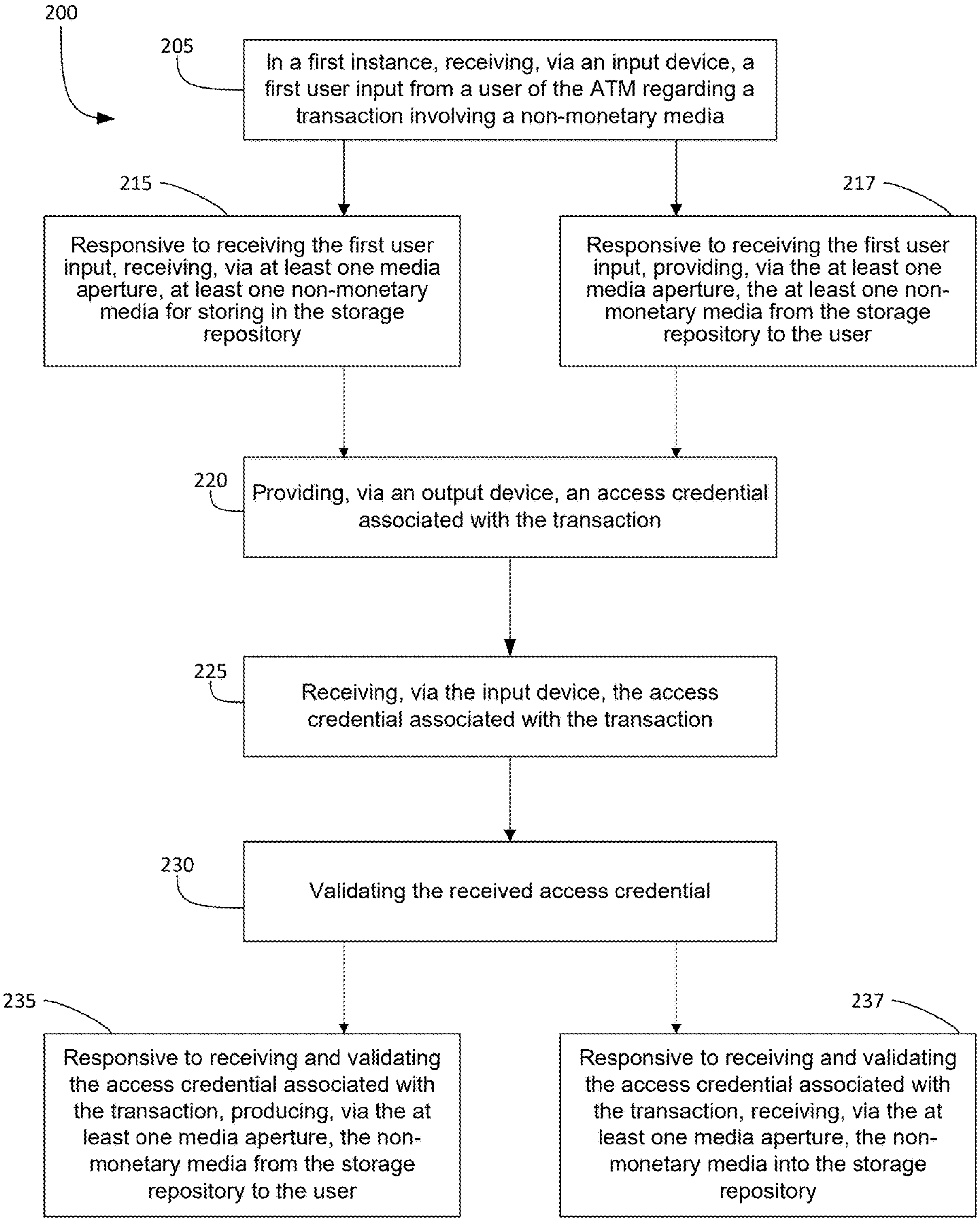
FIG. 5 is a flowchart illustrating a method for storing non-monetary media via an ATM, according to an example embodiment.

Referring now to FIG. 5, an example method 200 for storing non-monetary media via an ATM is shown, according to an example embodiment. As described in greater detail below and in one embodiment, the transaction device 140 may receive, via the input device, a first user input from a user of the ATM regarding a transaction involving a non-monetary media. For example, the first input may include a user selecting a button, touch screen prompt, or other identifier to begin a transaction associated with the non-monetary media. Such transactions may include temporarily storing a personal item in the ATM storage repository (e.g., storing a handbag or purse in the ATM storage repository while the user goes swimming and receiving a passcode to retrieve the handbag at a later time), temporarily retrieving/renting an item from the non-monetary storage repository (e.g., retrieving a pair of bowling shows from the ATM for use at a bowling alley and receiving a QR code to unlock the storage repository to return the bowling shoes before leaving), exchanging an item at the ATM (e.g., depositing a cell phone into the storage repository in exchange for currency), or any other suitable transaction involving non-monetary media. Accordingly, the transaction device 140 may launch an application, begin a program, or otherwise function to provide non-monetary storage services for the user. Because method 200 may be implemented with the system and components shown in FIGS. 1-4, reference may be made to one or more components of FIGS. 1-4 in explaining method 200.

At step 205, the transaction device 140, in a first instance, receives, via an input device, a first user input from a user of the ATM regarding a transaction involving a non-monetary media. As discussed above, the input device may include a keyboard 185, a touchpad 183, or any other suitable device. The first user input may include a selection of a transaction involving the non-monetary media such as a button press, a keypad selection, a wireless command, or the like. For example, the ATM may display multiple potential selections or prompts such as "insert card," "donate funds," or "store belongings." Prompts and/or selections such as "store belongings" may identify transactions involving non-monetary media. Other suitable first user inputs include button presses identifying item rental services (e.g., rent shoes, rent keys, rent binoculars, rent umbrellas, etc.) and selections allowing for item exchanges (e.g., exchange phone for cash, exchange currency for envelope/stamps, or the like). In some embodiments, the first user input may be received by the ATM from a mobile device 106. For example, the ATM may receive a communication from a mobile device requesting that the ATM launch a program/process associated with a transaction involving non-monetary media.

At step 215, responsive to receiving the first user input, the transaction device 140 receives, via at least one media aperture 181, the at least one non-monetary media for storing in the storage repository 196. At this step, the transaction device 140 may receive non-monetary media for storage (e.g., temporarily housing the non-monetary item in a secure location), for exchange (e.g., receiving a non-monetary item and providing a user currency), or for another purpose (e.g., receiving a non-monetary item in exchange for another non-monetary item). In some embodiments, after receiving the first user input, the transaction device 140 will prompt a user (e.g., via the display 184) to insert or deposit the non-monetary media into the transaction device 140. For example, the storage repository may include a compartment, safe, safety deposit box, or other container integrated, formed, or otherwise coupled to the transaction device 140. The media aperture 181 may include a slot (e.g., a slot that accepts a phone, wallet, etc.) or another suitable device such as a dropbox, lift, or chute. In some embodiments, the media aperture 181 comprises a door 199. The door 199 may have an electronic lock, a key lock, an internal latch, or another locking mechanism configured to actuate between a locked state and an unlocked state. Upon receiving the first user input, the transaction device 140 may identify or select one or more doors 199 and cause the one or more doors 199 to actuate from the locked state to the unlocked state. In this way, a user may open the one or more doors to store the non-monetary media in the compartment behind the door 199. In some embodiments, rather than manually placing the non-monetary media in the storage repository 196, responsive to receiving the first user input, a transport apparatus 190 coupled to the at least one media aperture 181 may receive the non-monetary media and deliver the non-monetary media to the storage repository 196. For example, responsive to receiving a command initiating a storage transaction (e.g., via a touch screen press, the insertion of a storage fee, etc.) the transaction device 140 may open a slot and present a transport apparatus 190 including an arm, grabber, moveable plate, lift, or the like. The transaction device 140 may detect when non-monetary media is placed on the transport apparatus 190 (e.g., via a weight sensor, a countdown clock, a proximity sensor, a confirmatory button press, etc.) and in response transfer the non-monetary media from the media aperture 181 to the storage repository 196.

In some embodiments, responsive to receiving the first user input, the transaction device 140 may proceed to step 217. At step 217, after receiving the first user input, the transaction device 140 provides, via the at least one media aperture, the at least one non-monetary media from the storage repository 196 to the user. For example, the transaction device 140 may include a storage repository prepopulated with non-monetary media (e.g., for rent, for sale, etc.). The first user input may identify a transaction associated with non-monetary media such as "purchase stamps," "purchase/rent golf balls," "receive hotel room key," or the like. Accordingly, the transaction device 140, via the media aperture 181, the output device 182, the transport apparatus 190, etc., may provide non-monetary media from the storage repository responsive to the first user input. In some embodiments, the transaction device 140 may simultaneously or near simultaneously provide non-monetary media and receive non-monetary media (e.g., temporarily provide/store cell phone in storage repository 196 to receive movie tickets, exchange flyer/token to receive coupons, etc.).

At step 220, the transaction device 140 provides, via an output device, an access credential associated with the transaction. The access credential associated with the transaction may include a biometric (e.g., fingerprint, face scan, eye scan, photograph, etc.), a personal identification number, a passcode, a username and password combination, a token (e.g., a data payload stored on the user device 106), a barcode, a quick response (QR) code, or another suitable credential. In some embodiments, the access credential is specific to non-monetary media, to a particular storage compartment within the storage repository 196, to a particular user, etc. For example, the transaction device 140 may be configured to generate a QR code associated to a specific door 199, provide the QR code to a user device, and actuate the door 199 from the locked state to the unlocked state and vice versa in response to reading the QR code. In some embodiments, the access credential may be communicated via a short-range wireless communication subsequent to receiving the at least one non-monetary media for storing in the storage repository 196. For example, information regarding the non-monetary media, the transaction, and/or the user may be provided to the user device 106 via one or more short-range wireless communications (e.g., a "tap") between the transaction device 140 and the user device 106. The information may also be transmitted by the transaction device 140 to the provider institution computing system 104. For example, the transaction device 140 may transmit information to an NFC receiver of the user device 106. In some embodiments, a different wireless protocol is used (e.g., Bluetooth®). The user device 106 may be brought within a predetermined distance (e.g., 10 cm, 20 cm, etc.) of the transaction device 140 in order to send or provide a wireless transmission of a payload (e.g., data package) from a wireless transceiver (e.g., an NFC chip) embedded on the transaction device 140 to a wireless receiver (e.g., NFC reader) of the user device 106. The data package or payload may include the information indicative of the storage repository 196, the ATM, and/or the non-monetary media of the transaction. The access credential may have additional restrictions, such as requiring a combination of credentials to obtain the non-monetary media (e.g., requiring a personal identification code and a biometric, requiring a QR code and a username password combination, etc.).

In some embodiments, the method 200 may further include establishing, by the ATM, a wireless connection between the ATM and the provider institution computing system 104, responsive to receiving the first user input. The wireless connection may enable the provider institution to authenticate the user and/or the user device associated with the non-monetary transaction. For example, after receiving the first input, the ATM may present a prompt requesting that one or more user devices 106 and/or users be authenticated. Accordingly, the method 200 may include receiving, by the ATM, a second user input comprising user data indicative of a user device. The user data may include a phone number, an IP address, an email, a request for a one-time passcode, and the like. The provider institution computing system 104 may send a prompt for authentication information to the user device 106 in response to receiving the second user input. The provider institution computing system 104 may receive the authentication information and, in response, send, a notification to the user device 106. The notification may include an indication of verification of the authentication information. Once the user has been authenticated, the ATM may proceed with the transaction associated with the non-monetary media.

At step 225, the transaction device 140 receives, via the input device, the access credential associated with the transaction. For example, the user of the ATM may return to collect the non-monetary media from the storage repository 196. Accordingly, the transaction device 140 may receive the access credential and begin the process of providing access and/or returning the non-monetary media. For example, after storing a handbag, purse, watch, or other non-monetary media in the transaction device 140 and authenticating a user device 106 associated with the transaction, a user may return and the ATM may receive, from the user device, the access credential in the form of an NFC "tap" between the ATM and the user device. Upon receiving the access credential, the method 200 may proceed to step 230. In some embodiments, the transaction device 140 may be configured to generate a new access credential (e.g., if a previous access credential is lost, forgotten, expired, etc.).

For example, the user may access an application associated with the transaction device 140 and the non-monetary transaction via the user mobile device 106 and request a new access credential (e.g., after answering security questions, after signing in, after scanning a confirmation QR code, providing a biometric, or the like) and receive new access credentials upon verification of the user's identity.

At step 230, at least one of the provider institution computing system 104 and/or the transaction device 140 validates the received access credential. For example, the transaction device 140 may compare a username passcode combination to a stored username passcode combination associated with the transaction and verify the access credential if the combinations match. In another embodiment, the ATM and/or the provider institution computing system 104 may validate the access credential by receiving a QR code, PIN, or other access credential previously logged, stored, or associated with the transaction.

At step 235, responsive to receiving and validating the access credential associated with the transaction, the transaction device 140 produces, via the at least one media aperture 181 (or via the output device, the door 199, etc.), the non-monetary media from the storage repository 196 to the user. For example, in some embodiments, upon receiving and validating the access code, the transaction device 140 may cause the door 199 to actuate from the locked state to the unlocked state. The user may then open the door 199 and retrieve the non-monetary media. In another embodiment, the transaction device 140 may cause the transport apparatus 190 to transfer the at least one non-monetary media from the storage repository 196 to the at least one media aperture 181 in response to receiving the access credential associated with the transaction. For example, an internal lift, claw, cartridge, or the like may retrieve the non-monetary media, transfer the non-monetary media from the storage repository 196, and present the non-monetary media to the user.

In some embodiments, such as embodiments including step 217, the transaction device may proceed to step 237. For example, step 237 may occur in embodiments wherein the transaction device 140 is configured to rent, loan, or temporarily provide non-monetary media before receiving the non-monetary media back in the storage repository after a period of time. At step 237, responsive to receiving and validating the access credential associated with the transaction, the transaction device 140 receives, via the at least one media aperture 181, the non-monetary media into the storage repository 196.

In some embodiments wherein the transaction device 140 includes the sensor 195 (e.g., the sensor 195 located in the storage repository 196, coupled to the media aperture 181, etc.), the method 200 may include the step of collecting data indicative of an identity of the at least one non-monetary media. For example, the sensor 195 may include a camera, a QR scanner, a scale, or other suitable sensor configured to collect data indicative of an identity of the at least one non-monetary media. The data may include a shape, color, product ID, weight, barcode information, connectivity data received from the non-monetary media, and the like. For example, in embodiments wherein the transaction device 140 is configured to receive non-monetary media such as a mobile phone in the storage repository 196 in exchange for currency provided to the user, the transaction device 140 may identify the non-monetary media as a mobile phone by initiating communication with the mobile phone and confirming the identity of the non-monetary media as a mobile phone based on the communication session. Accordingly, the transaction device 140 may receive the at least one non-monetary media and using the data indicative of the identity, identify the at least one non-monetary media. The transaction device 140 may also provide the user with a monetary value associated with the identified non-monetary media via the output device and receive the at least one non-monetary media in the storage repository 196.

In some embodiments, the identity of the non-monetary media may affect a value associated with the non-monetary media. For example, if a vision system such as a camera identified a chipped/cracked screen of a mobile device submitted for trade-in at the ATM, the transaction device 140 may be configured to apply a mark-down, fee, or deduction to the offered price for trade-in based on the detected condition of the non-monetary media. In some instances, the transaction device 140 may look up a base value of an identified device in a look-up table (e.g., iPhone 12 Pro Max: $250.00) and apply a deduction or increase to the trade in value based on the condition (e.g., deduction for cracked/broken screen; increase for full charge, increase for screen cover, etc.). In some embodiments, (e.g., where the transaction device 140 is temporarily storing a user's non-monetary media in a secure location), the identity of the non-monetary media may designate additional security protocols and authentication procedures necessary to retrieve the item. For example, if a visual sensor, magnetic sensor, scale, input device, etc. causes the transaction device 140 to identify the non-monetary media as jewelry, the transaction device 140 may require a passcode, a mobile device link/associated email address for verification, and a biometric to ensure that only the user depositing the jewelry can retrieve the item. In still further embodiments, the sensor 195 may detect a large size or weight of the item (e.g., a handbag, travel bag, or the like greater than a predefined volume, greater than 25 lbs., etc.). Accordingly, the transaction device 140 may charge an increased fee to store the item of larger size/weight. In still further embodiments, the transaction device 140 may identify prohibited items via the sensor 195 and refuse to store/receive the items (e.g., firearms detected via metal detectors and/or vision systems).

Figure 6:
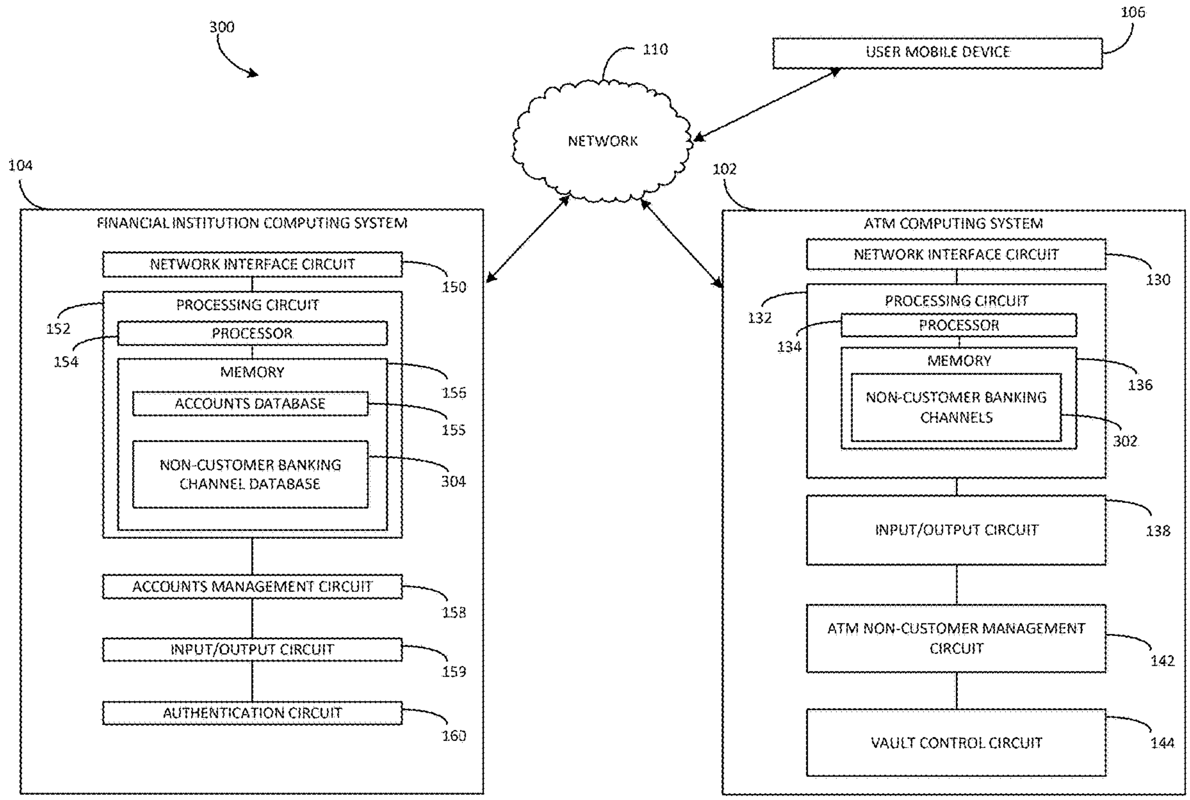
FIG. 6 is a block diagram of a transaction computing system for establishing non-customer banking channels via an ATM, according to an example embodiment.

Turning to FIG. 6, a block diagram of a transaction computing system 300 for establishing non-customer banking channels via an ATM is shown, according to an exemplary embodiment. As shown in FIG. 6, the ATM system 102 and the provider institution computing system 104 may include many of the same components as discussed above with respect to FIG. 1. Accordingly, like features shown in FIGS. 1 and 6 may perform similar functions and be comprised of similar components. In some embodiments, a transaction device 140 may support non-customer banking channels discussed herein and non-monetary storage services, may support non-customer banking channels discussed herein and not support non-monetary storage services, or vice versa. Accordingly, it should be understood that the transaction devices 140 may include any one, any combination, or all of the features and functionalities disclosed herein.

The ATM system 102 may be configured to support, provide, create, or otherwise allow interaction with one or more non-customer banking channels 302. For example, one or more non-customer banking channels 302 may be at least partially stored or manages on the memory 136 of the ATM. In some embodiments, the non-customer banking channels 302 may be stored, managed, or established by one or more components dispersed across the provider institution computing system 104 and/or the ATM system 102.

The provider institution computing system 104 may include a non-customer banking channel database 304. The non-customer banking channel database 304 is structured to retrievably store information regarding the non-customer banking channels 302. For example, the non-customer banking channel database 204 may function in a similar manner to the accounts database 155. In some embodiments, the non-customer banking channel database 304 may store information regarding a non-customer banking channel 302 associated with a non-customer of the financial institution and provided via the ATM computing system 102 and/or the user mobile device 106. For instance, the non-customer banking channel database 304 may store information related to the user, the user mobile device 106, and/or the ATM computing system 102 such as authentication information (e.g., username/password combinations, device authentication tokens, security question answers, OTPs, PINs, biometric information, etc.), user information (e.g., name, date of birth, etc.), non-customer banking channel information (e.g., account number, balance information, balance limit, expiration date, ATMs permitted to access/host the banking channel, etc.), and so on. In various embodiments, the non-customer banking channel database 304 is structured as one or more remote data-storage facilities (e.g., cloud servers).

Figure 7:
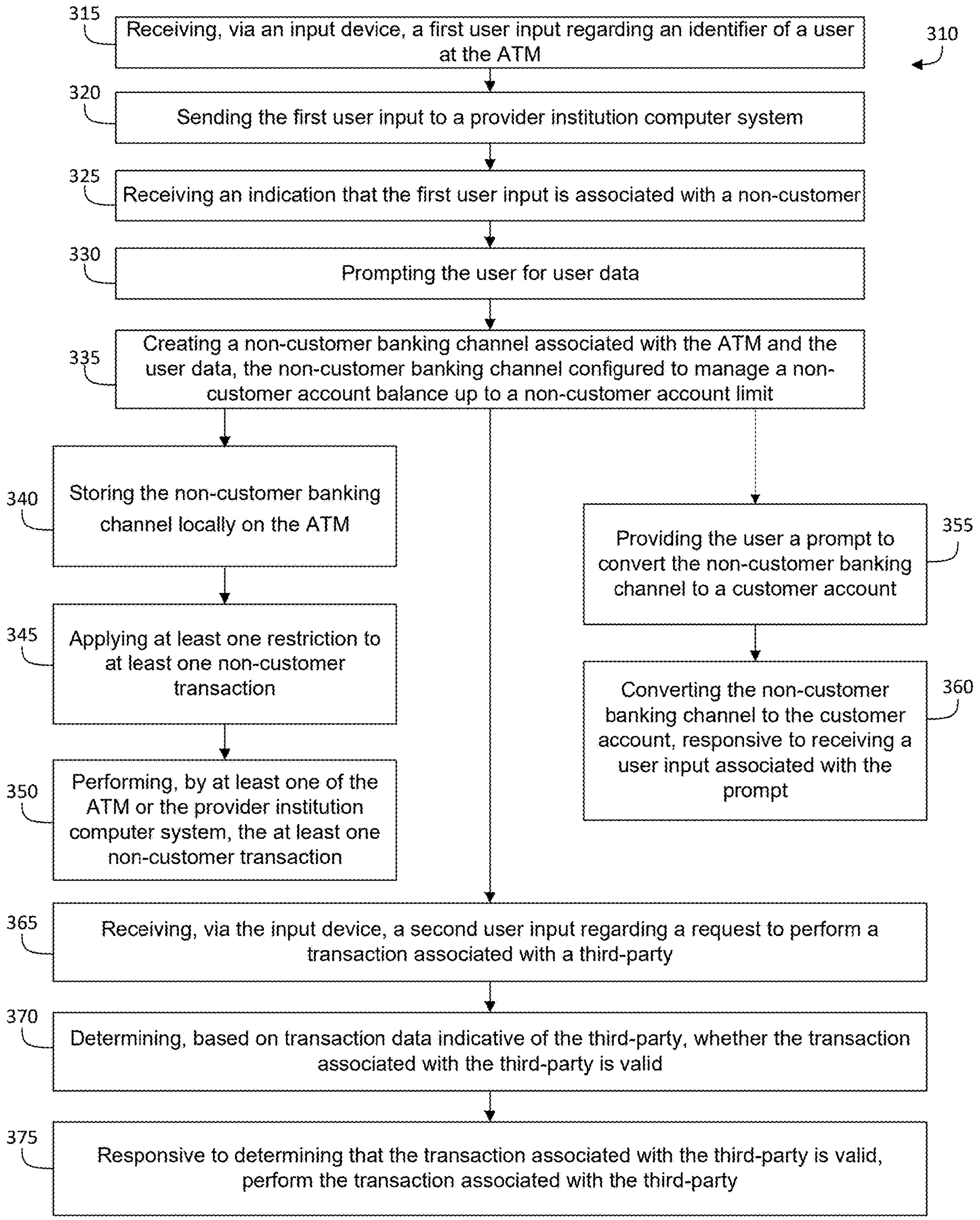
FIG. 7 is a flowchart illustrating example steps for a method for providing a non-customer banking channel via an ATM, according to an example embodiment.

Turning to FIG. 7, an example method 310 is shown for providing a non-customer banking channel 302 via an ATM, according to an example embodiment. These steps may be performed in a different order than the exemplary order shown in FIG. 7. Additionally, the shown steps may be optional, repeated, separated by additional optional steps or intervening steps, or expanded upon to include additional actions/functionalities. All such iterations of the operating process as would be apparent to a person of ordinary skill in the art are contemplated within this disclosure.

At step 315, the method 310 may include receiving, via an input device of the transaction device 140 such as a touch screen, keypad, or the like, a first user input regarding an identifier of a user at the ATM. The first user input may identify the user as a non-customer or the banking institution and/or as a user interested in creating/accessing a non-customer banking channel. In some embodiments, the first input may include a screen tap, a command to launch a non-customer banking program/application, or the like. In some embodiments, the first user input may include information identifying the user sufficient to create or establish a non-customer banking channel 302 associated with the user. The user information may include a name, drivers license number, phone number, address, email, social security number, credit card number, or other suitable information.

At step 320, the method 310 may include sending, by the transaction device 140, the first user input to the provider institution computing system 104. For example, the transaction device 140 may establish a wireless connection with the provider institution computing system 104 and transmit one or more messages containing or indicative of the first user input. In some embodiments, the transmission may be encrypted to ensure the security of the information and privacy of the user.

At step 325, the method 310 may include, receiving, by the transaction device 140, an indication that the first user input is associated with a non-customer or request to open a non-customer banking channel 302. For example, the provider institution computing system 104 may compare the user information to accounts, user data, and the like corresponding to customer accounts or previously created non-customer banking channels 302. Upon a comparison indicating that the user data is new to the provider institution, not related or associated with other accounts of the provider institution, or the like, the ATM may receive a message and/or command to begin a program or application for non-customer banking. In some embodiments, the ATM may first provide a prompt providing the user with an option to register as a customer of the provider institution before proceeding to non-customer banking.

At step 330, the method 310 may include the transaction device 140 prompting the user for user data. The user data may include data sufficient to establish the non-customer banking channel 302 and/or parameters associated with the non-customer banking channel 302. As discussed above, user data sufficient to establish the non-customer banking channel 302 may include information indicative of the user or the non-customer banking channel 302 such as a name, address, SSN, account number, credit card number, or the like. In some embodiments, the user data may include parameters, preferences, or other data to designate or control aspects of the non-customer banking channel 302. For example, the ATM may prompt the user to designate or select an account nickname for the non-customer banking channel 302, select or designate a non-customer banking account balance limit (e.g., a maximum amount of funds that may be stored in the non-customer banking channel 302) from a selection of options (e.g., $500, $1000, $2000, etc.). Larger non-customer account limits may be associated with a larger fee to open the non-customer banking channel 302, reduced fees when transacting with the non-customer banking channel 302, or the like. Further, the ATM may present a prompt for user data to designate specific ATMs at which the non-customer banking channel 302 may be accessed. The ATM may present a map of nearby ATMs, a list of ATMs and their ID numbers/locations, or may receive a geographic area (e.g., a city, a state, etc.) in which to allow access to the non-customer banking channel 302. In some embodiments, the ATM may charge a fee associated with increasing the accessibility of the non-customer banking channel 302, may limit the accessible ATMs to a number pre-designated by the provider institution, or the like.

At step 335, the method 310 may include creating, by at least one of the transaction device 140 and/or the provider institution computing system 104, the non-customer banking channel 302 associated with the ATM and the user data. The non-customer banking channel 302 may be configured to manage a non-customer account balance up to a non-customer account limit such that the non-customer may deposit funds, withdraw funds, pay bills, transfer funds, donate funds, and the like using the currency associated with the non-customer account balance. In some embodiments, the ATM may dispense or provide a transaction card, a transaction ID, a QR code, or a similar token or transaction media via which the user may make purchases or access funds of the non-customer banking channel 302.

At step 340, the method 310 may include storing, by the transaction device 140, the non-customer banking channel 302 locally on the transaction device 140. For example, at this step, the ATM may create a file, log, data object, or the like to track and/or manage the non-customer banking channel 302. For example, the non-customer banking channel 302 may be stored as a local file on the ATM such that the non-customer banking channel 302 may be managed and accessed even if the ATM is in an offline mode or disconnected from the provider institution computing system 104. Additionally, the ATM may store one or more backups of the non-customer banking channel 302 and/or provide one or more backups of the non-customer banking channel 302 to the provider institution computing system 104.

At step 345, the method 310 may include, applying, by at least one of the transaction device 140 and/or the provider institution computing system 104, at least one restriction to at least one transaction associated with the non-customer banking channel 302. The restriction may include a fee associated with a transaction, a limitation or cap placed on a transaction, a limit to how, when, or where the non-customer banking channel 302 may be accessed, a limitation on how funds associated with the non-customer banking channel 302 may be used, a requirement that a transaction be verified by a customer, the mobile device 106, the provider institution computing system 104, and/or a financial agent/broker, etc. For example, a non-customer withdrawing and/or depositing funds into a non-customer banking channel 302 may be charged a fee for using the non-customer banking channel (e.g., a $2 deposit fee) and/or may be limited to only withdrawing a certain amount of funds within a predefined period of time (e.g., $200 per day).

At step 350, the method 310 may include performing, by at least one of the transaction device 140 and/or the provider institution computing system 104, the at least one non-customer transaction. For example, the transaction device 140 may dispense currency debited from the non-customer account balance via an output device. The provider institution computing system 104 may credit physical currency deposited at the ATM to the non-customer account balance. The ATM may establish a connection with the provider institution computing system 104 and pay a bill, invoice, or other balance due with funds from the non-customer banking channel. In some embodiments, the ATM may provide a digital or physical receipt confirming the transaction and associating the transaction with an identifier (e.g., a transaction number, code, time stamp, etc.).

At step 355, the method 310 may include the step of providing, by at least one of the provider institution computing system 104 and/or the transaction device 140, a prompt to convert the non-customer banking channel 302 to a customer account. The prompt may include a selection selectable via an input/output device 182 of the transaction device, text displayed via ATM display 184, an audio message instructive of steps to convert the non-customer banking channel 302 to a customer account (e.g., "Visit www.BankA.com to learn how to upgrade this account."), or the like. In some embodiments, the non-customer banking channel 302 may include a predefined or designated life span (e.g., 6 months, 1 year, 2 years, etc.) at the end of which the non-customer banking channel 302 may automatically convert to a customer account, may terminate (e.g., only permit withdrawals until the funds are removed and the account is closed), or may require a fee to extend the duration of the non-customer banking channel 302. In some embodiments, the non-customer banking channel 302 may be subscription-based and a subscription payment associated with the non-customer banking channel 302 may be debited from the balance of the non-customer banking channel 302.

At step 360, the method 310 may include the step of converting, by at least one of the transaction device 140 and/or the provider institution computing system 104, the non-customer banking channel 302 to a customer account, responsive to receiving a user input associated with the prompt (e.g., the prompt associated with step 355). At this step, the non-customer banking channel 302 may be converted, transferred, or otherwise transitioned into an account having the same status, permissions, and functionalities as a customer account. The transaction device 140 and/or the provider institution computing system 104 may receive additional user information responsive to the prompt to convert the non-customer banking channel 302 to a customer account. The additional user information may include any information necessary to register the non-customer and/or the non-customer banking channel 302 as a customer/customer account. For example, the information may include a social security number, an account username and password combination, a biometric, a credit score, or other suitable information. The transaction device 140 and/or the provider institution computing system 104 may transfer one or more files, data object, etc. from a non-customer account database (e.g., non-customer banking channel database 304) to a customer account database (e.g., accounts database 155). In some embodiments, one or more restrictions associated with the non-customer banking channel 302 may be removed or may no longer be applied by the transaction device 140. In various embodiments, the non-customer banking channel 302 may be converted or otherwise become a checking account, a savings account, a money market account, a business account, a joint account held in common with another customer of the provider institution, a trust account, a transfer-on-death account, a payable on death account, or another suitable account.

The transaction device systems disclosed herein may also provide expanded functionalities for non-customers directed to transactions involving third parties. For example, the transaction device 140 may include one or more circuits configured to perform steps 370 through steps 365 through step 375.

Figure 8:
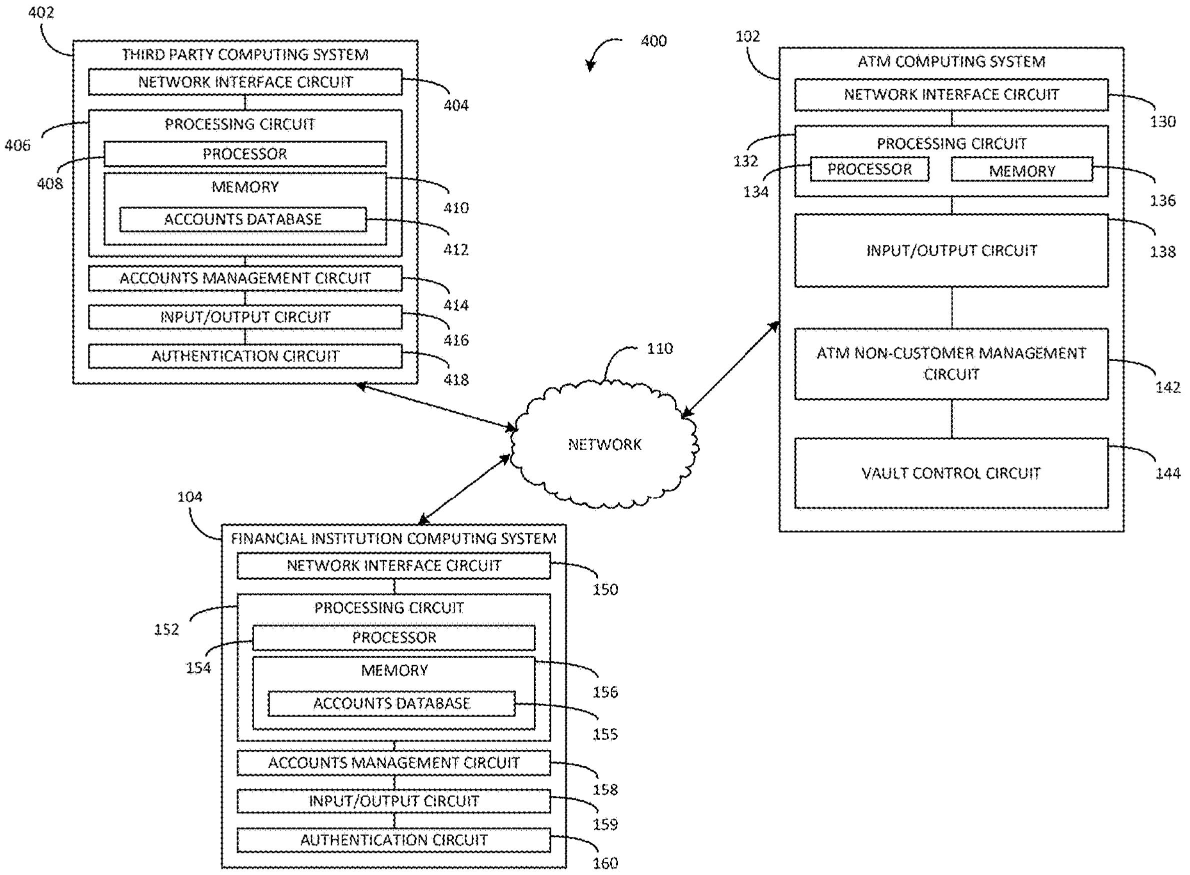
FIG. 8 is a block diagram of a transaction computing system for allowing customers and non-customers to transact with third parties via an ATM, according to an example embodiment.

At step 365, the method 310 may include the step of receiving, by the transaction device 140 (e.g., via the I/O device 182), a second user input regarding a request to perform a transaction associated with a third-party. FIG. 8 illustrates a block diagram of a transaction computing system 400 for allowing customers and non-customers to transact with third parties via an ATM, according to an exemplary embodiment. Referring to FIG. 8 and along with FIG. 7, the method 310 and corresponding systems and components may include and/or communicatively connect to a third-party computing system 402. The third-party computing system 402 may be associated with a third-party provider, such as a financial institution, business, charitable organization, individual, or entity other than the provider associated with the transaction device 140. For example, in one embodiment, the transaction device 140 may include an ATM provided and operated by Bank A. In this embodiment, a third-party institution may include Bank B, Credit Union C, Non-Bank Financial Institution D, Business E, Charity F, etc. The second user input may include a button press, a command to launch an application, program, or functionality of the transaction device 140 associated with the third party, a signal received by the transaction device 140 from a user mobile device 106 requesting a transaction be performed with a third party, the insertion of a check drawn on a third-party financial institution, or another suitable input.

In some embodiments, the request to perform the transaction associated with the third-party comprises a request to deposit funds in an account (e.g., a checking account, a savings account, etc.) not belonging to the ATM user. For example, the transaction may include a fund transfer, bill pay, or donation to a third party (e.g., a user may insert currency and have the currency credited to an account held by the third party at the provider institution). In this way, the transaction device 140 may serve as a "donation box" for a charitable organization or may serve as a conduit to pay bills, satisfy invoices, etc.

In some embodiments, the request to perform a transaction associated with the third-party may comprise a request to cash a check drawn on an account associated with a third-party financial institution (e.g., a request to cash a check in a checking account at Bank B via the ATM provided by Bank A).

At step 370, the method 310 may include the step of determining, by at least one of the transaction device 140 or the provider institution computing system 104, based on transaction data indicative of the third-party, whether the transaction associated with the third-party is valid. For example, the transaction device 140 and/or the provider institution computing system 104 may initialize an authentication process, whereby the user is prompted to complete steps regarding a user and/or third-party account authentication process before conducting the transaction. The authentication process may include connecting to and/or communicating with the third-party institution computing system 402. The provider institution computing system 104 and/or the transaction device 140 may generate and provide a prompt or launch a security application via which the transaction device may receive authentication information. The authentication information may include data or information indicative of the identity of the user that is requesting the initiation of an ATM transaction with a third party or information indicative of an account associated with the third-party. The authentication information include any one or more of a password, a PIN (personal identification number), a user ID (e.g., a username, an alpha, numeric, or alphanumeric value regarding the user, etc.), an answer to a verification question, a biometric (e.g., a picture of the user's face, a fingerprint, a voice sample, a retina scan, etc.), information indicative of the user's possession of a transaction card and/or the user mobile device 106, and/or a combination thereof. One or more of these pieces of authentication information may be transmitted to the provider institution computing system 104 and/or the third-party institution computing system 402. Depending on the authentication information prompted for, authentication of the user and/or the transaction may be structured as a multi-factor authentication. The transaction device 140 and/or the provider institution computing system 104 may verify the validity of the received authentication information by determining whether the received authentication information matches corresponding authentication information stored by the provider institution computing system 104 (in the accounts database 155, for example) or stored by the third-institution computing system 402.

At step 375, the method 310 may include the step of, responsive to determining that the transaction associated with the third-party is valid, performing, by at least one of the transaction device 140 and/or the provider institution computing system 104, the transaction associated with the third-party. For example, in one embodiment, the transaction associated with the third party may include receiving funds as a donation to a third-party account. In a specific embodiment, an organization, individual, entity, etc. may establish a donation account with the provider institution. For example, the donation account may be an account configured to receive deposits from multiple sources such as multiple users, non-customers, ATM locations, point of sale terminals, web portals, and the like. The third party may designate one or more sources via which users may donate funds to the donation account. For example, an organization like the American Red Cross may open a donation account associated for disaster relief and may designate ATMs in Texas, California, New York, and Delaware as sources via which ATM users may donate to the account. In some embodiments, any plurality of ATMs or sources may be designated and the provider institution may organize or report the sources through which funds are deposited by area, by region, by amount deposited, or the like (e.g., indicate that in the past 3 months, $XXXX.XX was received from ATMs in the Southern U.S., $YYY.YY was received from ATMs in the Western U.S., $ZZ.ZZ was received from ATMs in the tri-state area, etc.). Accordingly, a user (e.g., a non-customer or a customer) may approach an ATM, select a prompt such as "Donate to the Red Cross," and insert cash, deposit a check, insert a card, or otherwise direct that funds of the user be donated to the account associated with the Red Cross.

In some embodiments, the request to perform a transaction associated with the third-party may comprise a request to cash a check drawn on an account associated with a third-party financial institution (e.g., a request to cash a check in a checking account at Bank B via the ATM provided by Bank A). For example, the transaction device 140 provided by Bank A may receive a check directed to a non-customer of Bank A (e.g., a check to deposit funds in an account of Bank B). The transaction device 140 may process the check, verify the validity of the transaction (e.g., whether an account at Bank B associated with the non-customer exists, whether another transaction associated with the check has been competed, etc.), and upon determining the validity of the transaction, cash the check in the account of Bank B.

Figure 10:
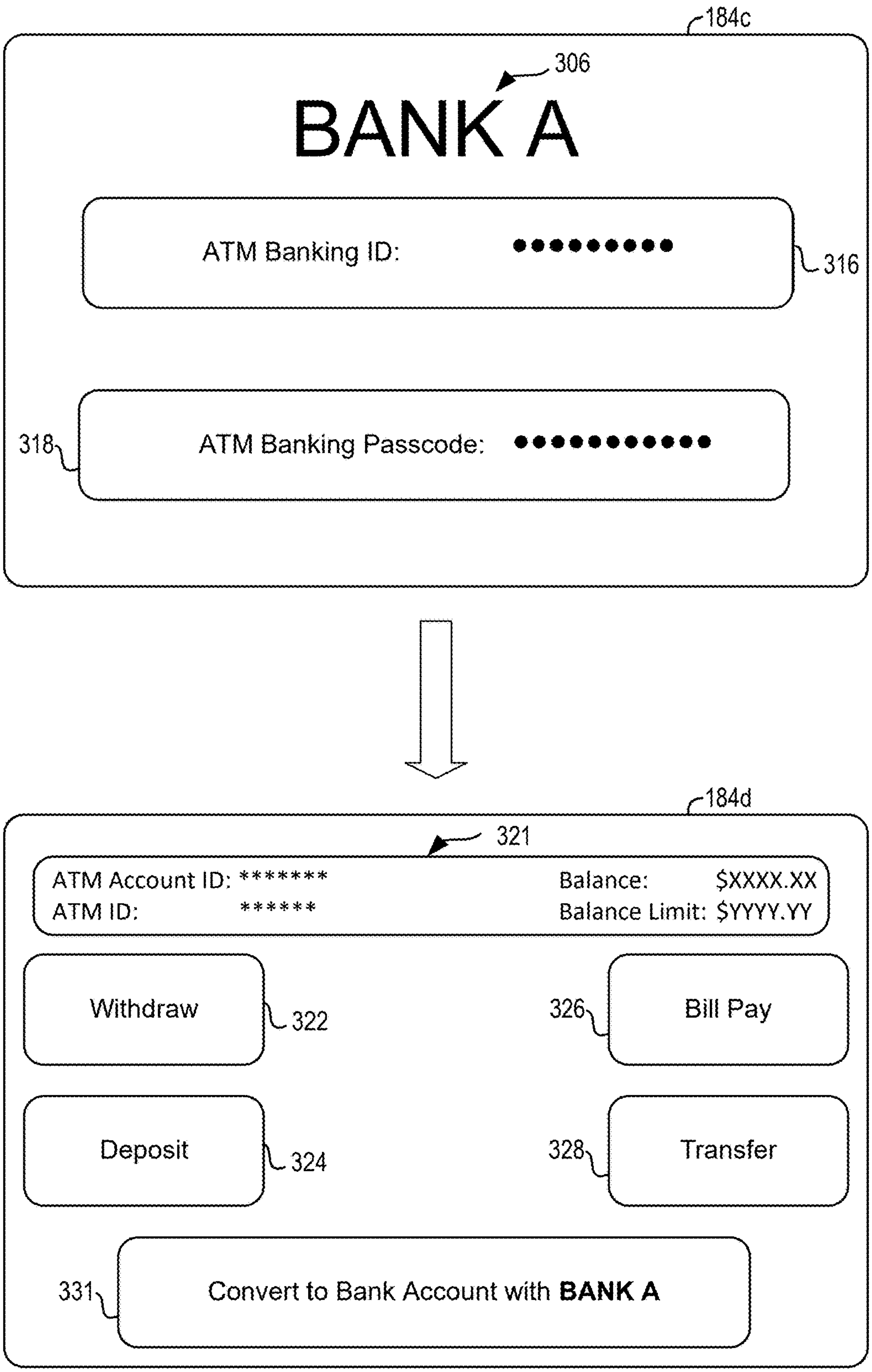
FIG. 10 illustrates additional example user interfaces of an ATM, according to an example embodiment.

Turning to FIGS. 9-10, example user interfaces of an ATM interoperable with the systems and methods disclosed herein are shown, according to an example embodiment. As shown in FIGS. 9-10, the transaction device 140 may include a display 184 configured to provide one or more user interfaces (UIs) for providing expanded functionalities directed to customers and non-customers of the provider institution. The display 184 may be divided and/or subdivided into one or more zones. For example, some zones of the display may be touch sensitive, while others may not be touch sensitive and may merely display information. Other zones may be selectable via buttons, dials, knobs, or the like positioned adjacent to the display 184 or via an I/O device 182 such as a keyboard, cursor, etc. The display 184 may include one or more identifiers 306 associated with the provider institution. In FIGS. 9-10, the identifier 306 indicates that the transaction device 140 is an ATM associated, operated, and/or provided by Bank A.

As shown in the first display 184*a* of FIG. 9, the ATM may present an initial selection for a user. The initial selection may include one or more prompts 308, 311 for a first user input that may distinguish between customers and non-customers. For example, as shown in the first display 184*a*, customers may be prompted to begin transactions by prompt 308 instructing customers to insert their Bank A transaction card to begin a transaction. For individuals without a Bank A transaction card (e.g., non-customers of Bank A), the UI of the transaction device 140 is configured to receive a first input indicating that the individual wishes to transact as a non-customer of Bank A (e.g., by launching an application for Local ATM Banking such as a non-customer banking channel).

Turning to the second display 184*b* of FIG. 9, an example UI is shown after prompt 311 "Begin Local ATM Banking" is activated. The transaction device 140 may present a second selection UI such as the second display 184*b*. The second display 184*b* includes a prompt 312 for "new" non-customers (e.g., non-customers who do not have a non-customer banking channel 302 but may intend to open/create one). Following a selection of prompt 312, the transaction device 140 may present a follow-up display requesting user information/data sufficient to establish and create a non-customer banking channel 302 for the user. For example, the transaction device 140 may request an address, name, SSN, username and passcode combination, PIN code, desired account balance limit, desired designated ATMs from which to access the non-customer banking channel 302, an email address, a mobile phone number, a biometric, or other suitable information to establish a non-customer banking channel 302.

The second display 184*b* may also present a prompt 314 for returning and/or established non-customers. For example, the prompt 314 allows existing non-customers to access non-customer banking channels 302 that have already been created and/or associated with the transaction device 140. For example, a selection of prompt 314 "Access ATM Banking Channel" may cause the transaction device 140 to present a UI such as the third display 184*c* shown in FIG. 10. The third display 184*c* requests access credentials, for example, via prompt 316 requesting a non-customer banking ID/username and via prompt 318 requesting an associated non-customer banking passcode. After receiving a non-banking username and passcode combination, the transaction device 140 may request further authentication (e.g., confirmation of a one-time passcode send to an email or a user mobile device 106, approval via an app on the user mobile device 106, receipt of a biometric in addition to the username passcode combination, or the like). In this way, access to non-customer banking channels 302 may be beneficially secured behind one or more layers of authentication.

Turning to the fourth display 184*d* shown in FIG. 10, the transaction device 140 may provide access to the non-customer banking channel 302 and its associated functionalities after receiving and validating the credentials of the non-customer at a designated ATM. In some embodiments, the UI associated with the non-customer banking channel 302 includes an account data identifier 321. The account data identifier 321 may display information indicative of the account, its status, and its associated ATMs, users, etc. For example, the account data identifier 321 shown in FIG. 10 provides an ATM account ID (e.g., account number associated with the non-customer banking channel 302), an ATM ID (e.g., identified associated with the ATM on which the non-customer banking channel 302 is hosted/accessed), a current non-customer account balance of funds in the non-customer banking channel 302, and a non-customer account limit illustrating a maximum amount of funds that may be deposited/held in the non-customer banking channel 302.

Also as shown in FIG. 10, the fourth display 184*d* may include one or more prompts 322, 324, 326, 328 configured to cause the transaction device 140 to perform one or more non-customer transactions via the non-customer banking channel 302. For example, the non-customer may withdraw funds debited to the non-customer banking channel 302, may deposit funds credited to the non-customer banking channel 302, may pay a bill/invoice/fee due using the funds stored in the non-customer banking channel 302, or may transfer funds from the non-customer banking channel 302 to another financial account. As discussed herein, each transaction may be associated with a non-customer transaction fee. Further, the fourth display may provide a prompt 331 that, upon selection, may cause the ATM and/or the provider institution computing system 104 to begin the process of converting the non-customer banking channel 302 into a customer account. The ATM may provide additional displays instructive of the benefits and costs of converting the account. For example, the ATM may display a terms display indicating that converting the account will cost a fee, but will remove other restrictions unique to the non-customer banking channel that are not included on customer accounts (e.g., balance limits, non-customer fees, geographic limits on ATMs through which the account can be accessed, etc.). Further, selecting prompt 331 may cause the ATM to schedule a meeting between the non-customer and a banker of Bank A, or otherwise further the process of registering the non-customer as a customer of the provider institution (e.g., instructing the non-customer to register via a website of Bank A, prompting the non-customer to input additional information necessary to register as a customer of Bank A, etc.).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. Further, the features present in one drawing may be combined, included, or otherwise interoperate with the features disclosed in another drawing.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In some embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. An automated teller machine (ATM) comprising:

a storage repository configured to store at least one non-monetary media;

at least one processor and at least one memory coupled to the at least one processor, the at least one memory having instructions stored thereon that when executed by the at least one processor, cause the at least one processor to:

receive, via an input device and in a first instance, a first user input from a user of the ATM regarding a transaction involving the at least one non-monetary media;

receive, via at least one media aperture and responsive to receiving the first user input, at least one non-monetary media for storing in the storage repository;

provide, responsive to identifying the at least one non-monetary media, first currency associated with the identified at least one non-monetary media via a currency dispenser of the ATM to the user;

provide, via an output device, an access credential associated with the transaction to a user device via a short-range wireless communication subsequent to receiving the at least one non-monetary media;

receive, via the input device and in a second subsequent instance relative to the first instance and from the user device, the access credential associated with the transaction;

validate the received access credential;

receive second currency for the at least one non-monetary media; and provide access to, via the at least one media aperture and responsive to receiving the second currency and validating the access credential associated with the transaction, the at least one non-monetary media from the storage repository wherein:

the storage repository comprises a compartment, and the at least one media aperture comprises a door, the door configured to actuate between a locked state and an unlocked state;

wherein the instructions, when executed by the at least one processor, further cause the at least one processor to:

cause the door to actuate from the locked state to the unlocked state, responsive to receiving the first user input; and cause the door to actuate from the locked state to the unlocked state, responsive to receiving the access credential.

2. The ATM of claim 1, further comprising:

a transport apparatus coupling the at least one media aperture to the storage repository;

wherein the instructions, when executed by the at least one processor, further cause the at least one processor to:

cause the transport apparatus to transfer the at least one non-monetary media from the at least one media aperture to the storage repository in response to receiving the first user input; and cause the transport apparatus to transfer the at least one non-monetary media from the storage repository to the at least one media aperture in response to receiving the access credential associated with the transaction.

3. The ATM of claim 1, wherein the access credential associated with the transaction comprises at least one of a biometric, a personal identification number, a passcode, a username and password combination, a token, a barcode, or a quick response (QR) code; and the access credential is specific to the at least one non-monetary media.

4. The ATM of claim 1, further comprising:

a sensor coupled to at least one of the storage repository or the at least one media aperture, the sensor configured to collect data indicative of an identity of the at least one non-monetary media.

5. A method of using an automated teller machine (ATM) comprising:

receiving, via an input device and in a first instance, a first user input from a user of the ATM regarding a transaction involving at least one non-monetary media;

receiving, via at least one media aperture and responsive to receiving the first user input, the at least one non-monetary media for storing in a storage repository;

collecting data indicative of an identity of the at least one non-monetary media;

providing, responsive to identifying the at least one non-monetary media, first currency associated with the identified at least one non-monetary media via a currency dispenser of the ATM;

providing, via an output device and to a user device via a short-range wireless communication and subsequent to receiving the at least one non-monetary media, an access credential associated with the transaction;

receiving, via the input device and in a second subsequent instance relative to the first instance, the access credential associated with the transaction from the user device;

validating the received access credential;

receiving second currency for the at least one non-monetary media; and providing, via the at least one media aperture and responsive to receiving the second currency and validating the access credential associated with the transaction, the at least one non-monetary media from the storage repository to the user, wherein:

the storage repository comprises a compartment, and the at least one media aperture comprises a door, the door configured to actuate between a locked state and an unlocked state, and wherein the method further comprises:

causing the door to actuate from the locked state to the unlocked state, responsive to receiving the first user input; and causing the door to actuate from the locked state to the unlocked state, responsive to receiving the access credential.

6. The method of claim 5, further comprising:

establishing, by the ATM, a wireless connection between the ATM and a provider institution computing system, responsive to receiving the first user input;

receiving, by the ATM, a second user input comprising user data indicative of a user device;

sending, by the provider institution computing system, a prompt for authentication information to the user device in response to receiving the second user input;

receiving, by the provider institution computing system, the authentication information; and sending, by the provider institution computing system, a notification to the user device, the notification comprising an indication of verification of the authentication information.

7. The method of claim 5, further comprising:

causing a transport apparatus to transfer the at least one non-monetary media from the at least one media aperture to the storage repository in response to receiving the first user input; and causing the transport apparatus to transfer the at least one non-monetary media from the storage repository to the at least one media aperture in response to receiving the access credential associated with the transaction.

* * * * *